(12) United States Patent
Yoshida

(10) Patent No.: US 8,167,555 B2
(45) Date of Patent: May 1, 2012

(54) HORIZONTAL AXIS WIND TURBINE

(75) Inventor: Shigeo Yoshida, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 1196 days.

(21) Appl. No.: 11/920,861

(22) PCT Filed: May 22, 2006

(86) PCT No.: PCT/JP2006/310138
§ 371 (c)(1),
(2), (4) Date: Nov. 21, 2007

(87) PCT Pub. No.: WO2006/129509
PCT Pub. Date: Dec. 7, 2006

(65) Prior Publication Data
US 2009/0047129 A1    Feb. 19, 2009

(30) Foreign Application Priority Data

May 31, 2005   (JP) ................................. 2005-159848
Jul. 5, 2005    (JP) ................................. 2005-196548
Aug. 30, 2005  (JP) ................................. 2005-249524

(51) Int. Cl.
*F03D 7/02*    (2006.01)
(52) U.S. Cl. .............................. 416/32; 416/61; 416/155
(58) Field of Classification Search ................ 416/1, 32, 416/61, 155; 415/118, 123, 126, 130
See application file for complete search history.

(56) References Cited

U.S. PATENT DOCUMENTS

| 6,441,507 | B1 * | 8/2002 | Deering et al. ................. 290/44 |
| 2004/0105751 | A1 * | 6/2004 | Wobben .......................... 415/4.1 |
| 2004/0253093 | A1 | 12/2004 | Shibata et al. | |

FOREIGN PATENT DOCUMENTS

| CN | 1549897 A | 11/2004 |
| DE | 197 17 059 C1 | 7/1998 |
| EP | 1 429 025 A1 | 6/2004 |

(Continued)

OTHER PUBLICATIONS

Extended European Search Report, dated Jun. 27, 2011, for European Application No. 06756444.3.

(Continued)

*Primary Examiner* — Edward Look
*Assistant Examiner* — Aaron R Eastman
(74) *Attorney, Agent, or Firm* — Birch, Stewart, Kolasch & Birch, LLP

(57) ABSTRACT

Disclosed a horizontal axis wind turbine including: a rotor; a nacelle; a tower; an independent pitch control device; and a yaw control device, wherein the horizontal axis wind turbine is an up-wind type one including a waiting mode, wherein (1) the independent pitch control device performs a first step of changing all the blades to be in feathering states when the wind speed exceeds the predetermined value, a second step of changing the blades to be in reverse feathering states one by one sequentially, and a third step of holding all the blades in the reverse feathering states, and (2) the yaw control device controls a yaw brake to take a braking value allowing the yaw rotation when the wind speed exceeds the predetermined value, wherein the rotor is allowed to swing a leeward of the tower by executing the control operations (1) and (2) as the waiting mode.

7 Claims, 23 Drawing Sheets

FOREIGN PATENT DOCUMENTS

| | | |
|---|---|---|
| JP | 58-94881 U | 6/1983 |
| JP | 2004-11543 A | 1/2004 |
| JP | 2004-536247 A | 12/2004 |
| JP | 2006-16984 A | 1/2006 |
| WO | WO-03/058062 A1 | 7/2003 |

OTHER PUBLICATIONS

Shibata et al., "New Concept for Reducing Design Load," 25th Memorial Symposium of Wind Energy Utilization, 2003, Hei 15.

* cited by examiner

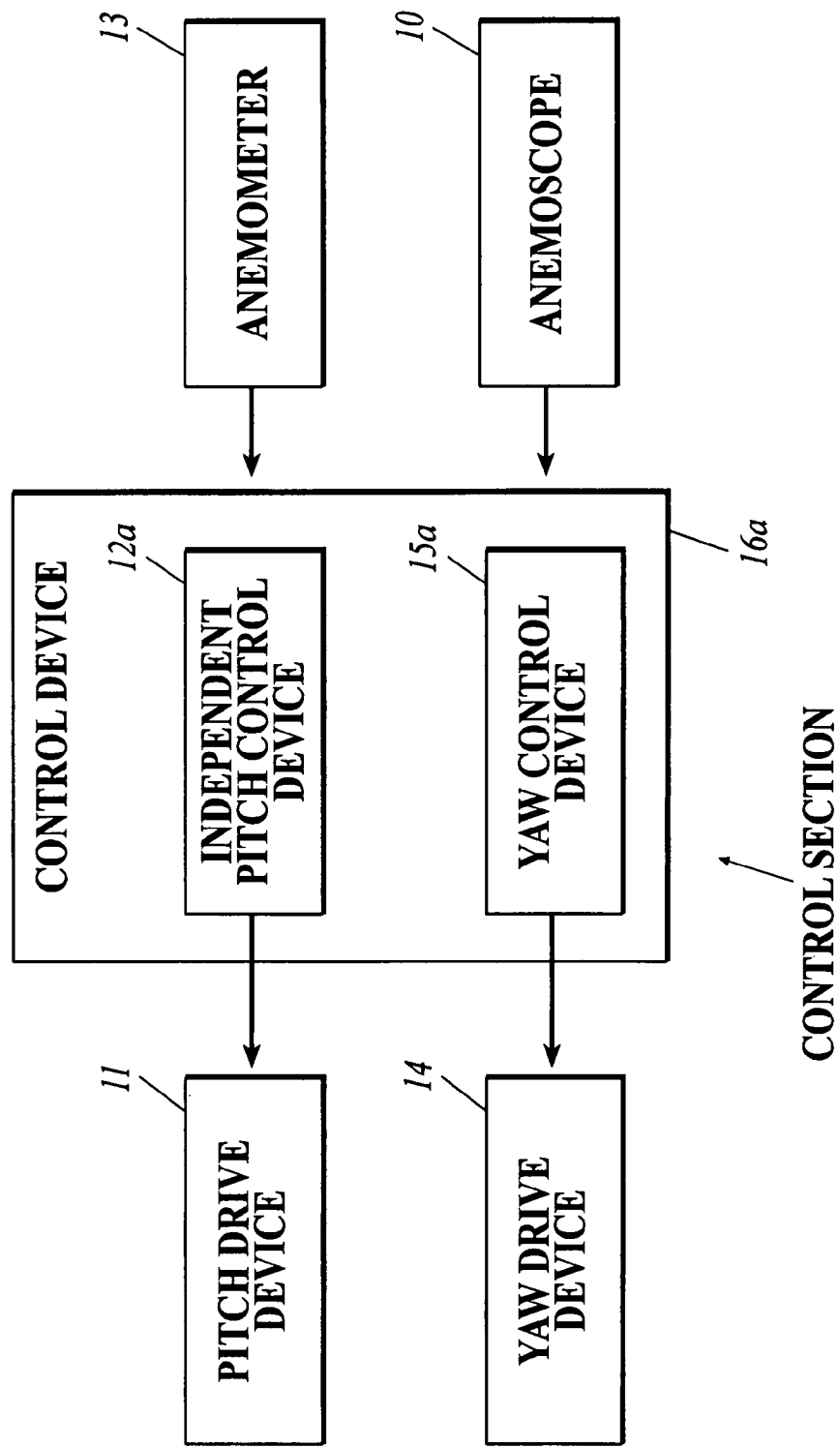

FIG3A

| MODEL NAME | A | B | C |
|---|---|---|---|
| CORRESPONDING TECHNIQUE | PRIOR ART 2 | PRIOR ART 3, 5 EXAMPLE OF PRESENT INVENTION THIRD EMBODIMENT | PRIOR ART 4 EXAMPLE OF PRESENT INVENTION FIRST AND SECOND EMBODIMENTS |
| SCHEMATIC VIEW OF WAITING POSTURE 1: TOWER 2: NACELLE 3: HUB 4: BLADE | NOT FOLLOWING WIND DIRECTION | WIND | WIND |
| COMMON CONDITIONS | NUMBER OF WINGS :3, DIAMETER OF ROTOR :80m, WIND CONDITIONS: SEE FIG. 4 | | |

FIG.3B

| MODEL NAME | A | B | C |
|---|---|---|---|
| WAITING YAW BRAKE | FIXED | 400kNm | 1,000kNm |
| WAITING PITCH ANGL | 87deg | 87deg | -97deg |
| ANALYSIS RESULTS — NACELLE AZIMUTHAL ANGLE (FIG. 5) | FIXED | FOLLOWING WIND DIRECTION | FOLLOWING WIND DIRECTION |
| ANALYSIS RESULTS — TORSIONAL DISPLACEMENT OF WING (FIG. 7) | -0.5~+0.7deg | -0.5~0.6deg | -0.4~0.4deg |
| ANALYSIS RESULTS — WING FLAP BENDING (FIG. 8) | -6~5MNm, VERY GOOD | -7~6MNm, GOOD | -5~6MNm, VERY GOOD |
| ANALYSIS RESULTS — WING TORQUE (FIG. 9) | -0.2~1.6MNm, SLIGHTLY BAD | -2.2~2.4MNm, SLIGHTLY BAD | -0.4~0.6MNm, VERY GOOD |
| ANALYSIS RESULTS — YAW TORQUE (FIG. 10) | -2.8~2.8MNm, SLIGHTLY BAD | -0.4~0.4MNm, VERY EARLY | -1.0~1.0MNm, GOOD |
| ANALYSIS RESULTS — YAW HORIZONTAL FORCE (FIG. 11) | ~0.58MN, GOOD | ~0.64MN, SLIGHTLY BAD | ~0.37MN, VERY GOOD |

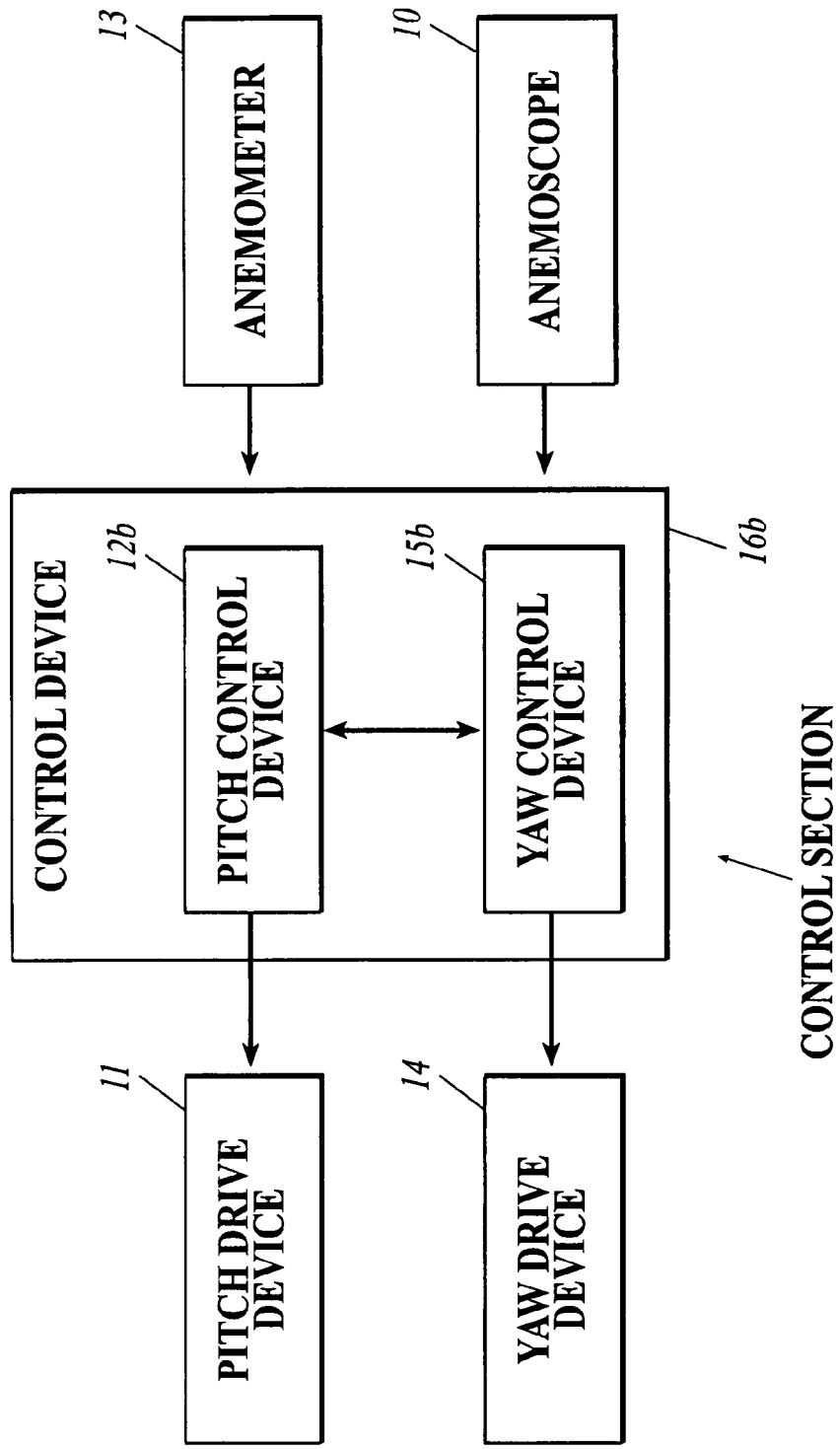

OVER-ROTATION EXISTING AREA
AND PITCH REVERSING PROCEDURE

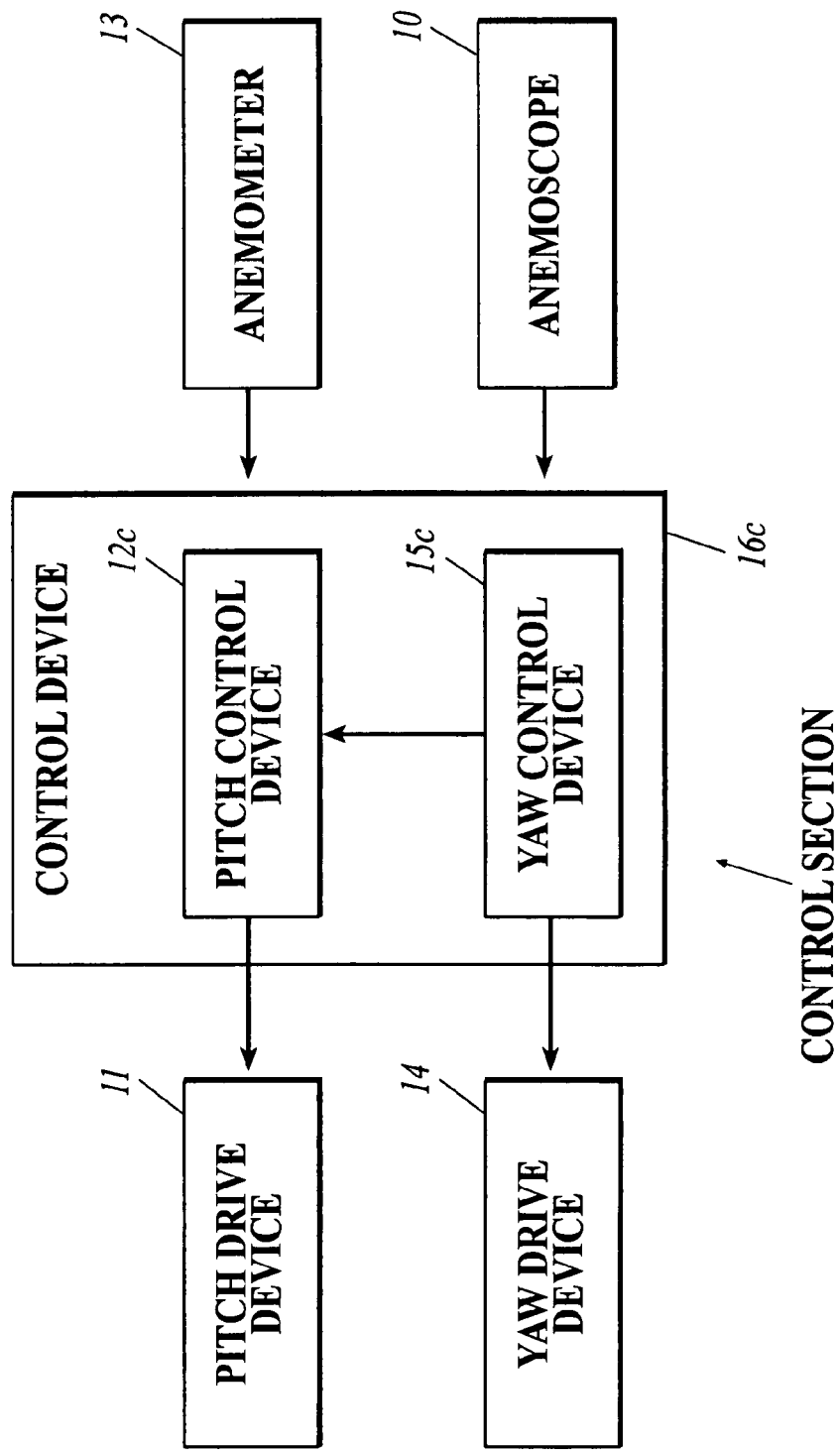

FIG.17
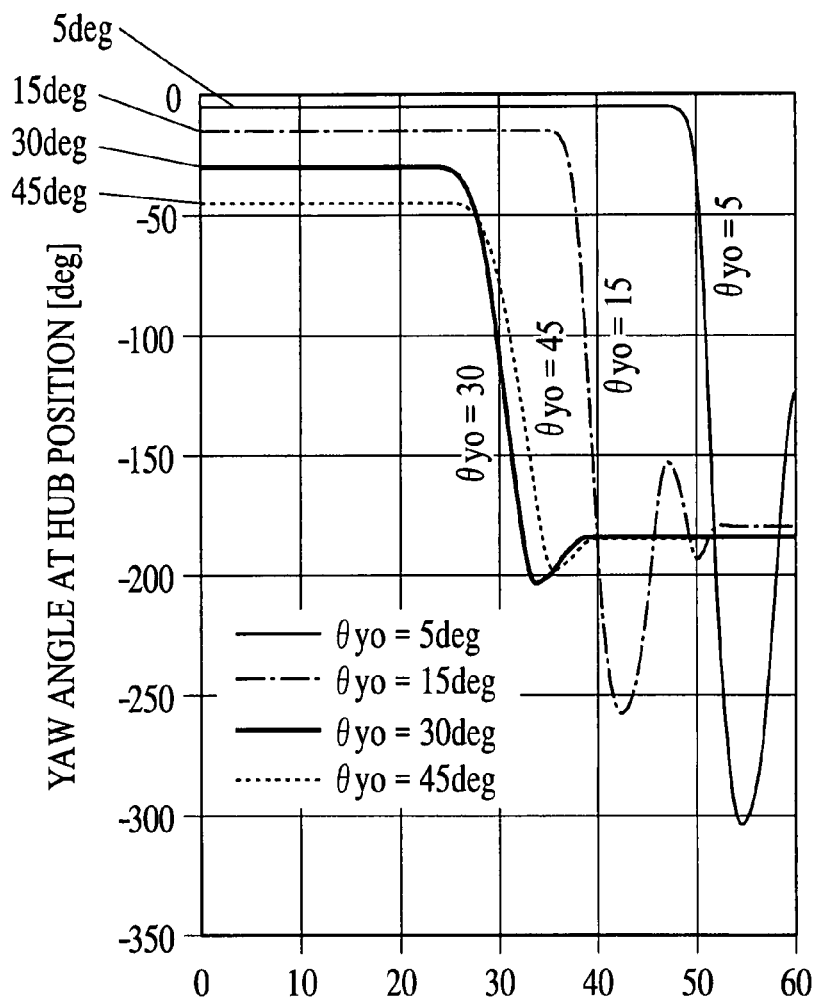
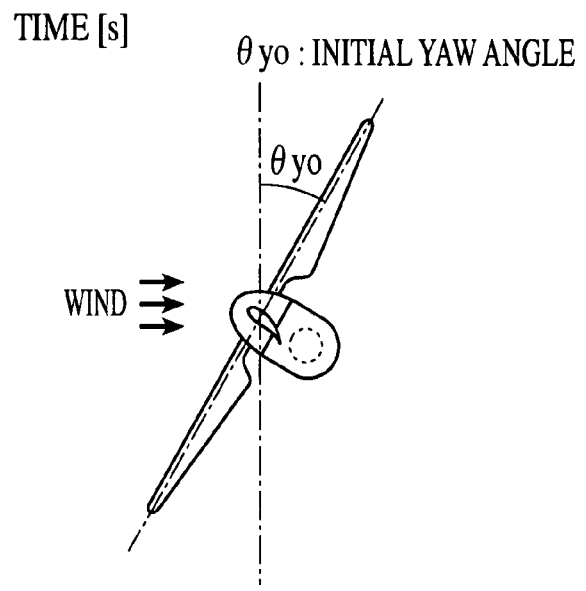
θyo : INITIAL YAW ANGLE

HORIZONTAL AXIS WIND TURBINE

TECHNICAL FIELD

The present invention relates to the waiting of an up-wind type horizontal axis wind turbine at the time of a windstorm.

BACKGROUND OF THE INVENTION

As is generally known, the so-called horizontal axis wind turbine has widely been put to commercially practical use. A general horizontal axis wind turbine is composed of a rotor, in which at least two blades are attached to a hub in a radial manner; a nacelle, which supports the rotor through the main shaft which is connected to the hub and extends substantially in the horizontal direction; and a tower, which is installed in substantially the vertical direction and supports the nacelle in the manner capable of performing a yaw rotation.

In addition, it has conventionally been performed to provide the horizontal wind turbine with control means such as yaw drive means capable of freely performing the drive control of the yaw rotation of the nacelle, a yaw brake to put a brake on the yaw rotation, and a main shaft brake to put a brake on the rotation of the rotor.

Moreover, many of the present commercial wind turbines are configured in the up-wind type horizontal axis wind turbines. The up-wind type horizontal axis wind turbine is a horizontal axis wind turbine having the configuration of generating electricity by the rotation of the rotor putted on the windward side of the tower.

The design strength of a wind turbine is generally greatly influenced by the load applied at the time of being in the waiting state during a windstorm. It is necessary to set the wind turbine load at the time of a windstorm on the supposition of the concurrence of a stoppage of power supply. In the following, typical prior arts 1-5 pertaining to the waiting method of a horizontal axis wind turbine is described.

[Prior Art 1]

Prior art 1 is a general up-wind stall control wind turbine, which performs waiting at the time of a windstorm by fixing the main shaft thereof with the brake thereof. It is the basis thereof to fix the yaw thereof at the time of waiting. A type of the prior art 1 achieves the reduction of the load thereof by controlling yaw to set the rotor thereof parallel to a wind direction. In the case where the electric power necessary for the yaw control is broken, or in the case where trouble is caused in any equipment pertaining to the yaw control, even if the yaw control is possible, there is the possibility of receiving very strong winds from all directions. Accordingly, it is necessary to design the wind turbine on the supposition of the strong winds from all directions. In the case of a stall control machine, a large load is generally generated in the case of the very strong wind from the front thereof or the back thereof.

[Prior Art 2]

Prior art 2 is a general up-wind pitch control machine, which performs waiting at the time of a windstorm by freely rotating the rotor thereof and fixing the yaw thereof. Some pitch control machines achieve the reductions of their loads by controlling yaw to direct their rotors to the windward side of the rotors. The yaw control premises that the pitch control machines have power sources necessary for the yaw control and each piece of equipment of the machines functions without any trouble. In the case of the pitch control machine, a large load is generally produced at the time of a side wind and a very strong wind from the oblique front or the oblique back. A model A shown in FIG. 3 corresponds to the waiting form of the prior art 2.

[Prior Art 3]

Prior art 3 is an up-wind pitch control machine, which secures the feathering of all blades before reversing the nacelle azimuthal angle thereof by about 180 [deg] by yaw control, and which performs waiting at the time of a windstorm by holding the blades with a weak yaw brake (see, for example, a non-patent document 1 and a patent document 2). The rotor thereof thereby swings to the leeward at a windstorm, and the load to the tower thereof can be reduced. The waiting form of the prior art 3 is apparently the same as that of prior art 5. A model B shown in FIG. 3 corresponds to the waiting forms of the prior art 3 and 5.

[Prior Art 4]

Prior art 4 is a downwind wind turbine pitch control machine, which secures the feathering of all blades, and freely rotates the rotor thereof to allow the rotor to be in the state of a free yaw. Then, the prior art 4 performs waiting in that state at the time of a windstorm. The rotor thereby swings to the leeward at the time of a windstorm, and the load operating to the peak of the tower thereof can be reduced. A model C shown in FIG. 3 corresponds to the waiting form of the prior art 4.

[Prior Art 5]

The prior art 5 is described in a patent document 1, and is a downwind wind turbine pitch control machine. After the prior art 5 has secured the feathering of all the blades thereof, the prior art 5 changes the pitch angle of each blade by about 180 [deg] one by one, and performs waiting in the state of a free yaw at the time of a windstorm. The maximum lift coefficient considerably decreases in the case where the wind turbine receives a wind from the trailing edges of the blades thereof in comparison with the case of receiving the wind from the leading edges of the blades, and the yaw holding torque thereof is also small. Consequently, the loads to be produced at the other parts thereof also become small. The waiting form of the prior art 5 is apparently the same as that of the prior art 3. The model B shown in FIG. 3 corresponds to the waiting forms of the prior art 3 and 5.

Patent Document 1: Japanese Patent Application Laid-Open Publication No. 2006-16984

Patent Document 2: WO 2003/58062

Non-Patent Document 1: Shibata Masaaki, Hayashi Yoshiyuki, "New Concept for Reducing Design Load," 25$^{th}$ Memorial Symposium of Wind Energy Utilization, Nov. 20, Hei. 15, pp. 225-227.

DISCLOSURE OF THE INVENTION

Problem to be Solved by the Invention

Even in the case of a wind turbine of 2 MW class, the strength problem thereof can be avoided by skillfully designing the wind turbine in accordance with the scale thereof by means of the prior art mentioned above. However, because the rigidities of the blades of a wind turbine still fall when the enlargement of the wind turbine further progresses in size in future and the natural frequency thereof becomes lower, a problem in which flutter is generated especially when the wind turbine receives a very strong wind from the neighborhood of the trailing edges of the blades thereof and large loads are easily produced on the blades is expected.

In the case of having the low rigidity blades as mentioned above, the up-wind type horizontal axis wind turbines of the prior art 1-3 cannot avoid a very strong wind from the neighborhood of the trailing edges of the blades independently of their waiting forms at the time of a windstorm, and flutter is produced. The modes of the flutter to be expected to be produced are the following two kinds of modes.

Stall Flutter: The lift curve slope to an angle of attack becomes negative in a stall area of a blade, and the aerodynamic term gives a negative damping effect in this area, which raises the unstable tendency of the blade. This is also produced in a blade having high torsion rigidity.

Bend-and-Torsion Coupled Flutter: Because a blade is an asymmetric and huge structure, bend and torsion are coupled to be produced. In particular, in the case where a blade receives a very strong wind from the neighborhood of the trailing edge of the blade, the blade receives a load and is bent. Because torsion is coupled to this, the angle of attack to flow in the blade changes, and the blade easily falls in an unstable tendency. This is scarcely produced in a blade having high torsion rigidity.

The up-wind wind turbine can considerably reduce the load at the time of a windstorm by adopting the waiting form to allow the rotor thereof to swing to the leeward of the tower thereof after the feathering of all the blades thereof have been secured, as the prior art 3. This is one of the ideal waiting forms in the up-wind wind turbine.

However, the prior art configuration to drive the yaw rotation of the nacelle thereof by the use of a yaw motor in order to allow the rotor to face to the leeward of the tower at a windstorm loses the motive power to put the rotor to the leeward of the tower when a trouble of the yaw drive mechanism thereof including the yaw motor thereof, such as the break of power supply to the yaw motor, has occurred with the occurrence of a windstorm, such as a typhoon. Consequently, the prior art configuration cannot take the waiting form in which the rotor is allowed to swing the leeward of the tower.

The present invention was made in view of the problem of the prior art, which have been mentioned above, and aims to enable an up-wind type horizontal axis wind turbine to secure the waiting form in which the rotor thereof swings to the leeward even if the yaw drive means thereof does not function at the time of a windstorm, and to reduce the design load of the wind turbine at the time of the windstorm by the waiting form.

Means for Solving Problems

The invention according to the claim 1 for settling the problem mentioned above is a horizontal axis wind turbine, including:

a rotor including a hub and at least two blades;

a nacelle to support the rotor with a main shaft connected to the hub;

a tower to support the nacelle in a manner capable of performing a yaw rotation;

an independent pitch control device to independently control a pitch angle of each of the blades; and a yaw control device to control the yaw rotation of the nacelle, wherein the horizontal axis wind turbine is an up-wind type one including: an operation mode to put the rotor to a windward side of the tower by the control of the yaw control device when a wind speed is a predetermined value or less, and to utilize wind force through a rotation of the rotor; and a waiting mode to wait in preparation for the operation mode when a wind speed exceeds the predetermined value, wherein (1) the independent pitch control device includes a control operation composed of a first step of changing all the blades to be in feathering states at the time of the wind speed exceeding the predetermined value, a second step of changing the blades to be in reverse feathering states one by one sequentially after the first step, and a third step of holding all the blades in the reverse feathering states until a return to the operation mode after the second step, and (2) the yaw control device includes a control operation to control a yaw brake to take a braking value allowing the yaw rotation by torque around a yaw axis, the torque loaded on the nacelle by the wind force, at the time of the wind speed exceeding the predetermined value, wherein the rotor is allowed to swing a leeward of the tower by executing the control operations (1) and (2) as the waiting mode.

The invention according to the claim 2 is the horizontal axis wind turbine according to claim 1, wherein the yaw control device executes the control operation (2) before the independent pitch control device executes the second step.

The invention according to the claim 3 is the horizontal axis wind turbine according to claim 1, wherein the yaw control device executes the control operation (2) before or at the same time when the independent pitch control device executes the first step.

The invention according to the claim 4 for settling the problem mentioned above is a horizontal axis wind turbine, including:

a rotor including a hub and at least two blades;

a nacelle to support the rotor with a main shaft connected to the hub;

a tower to support the nacelle in a manner capable of performing a yaw rotation;

a pitch control device to control pitch angles of the blades; and a yaw control device to control the yaw rotation of the nacelle, wherein the horizontal axis wind turbine is an up-wind type one including: an operation mode to put the rotor to a windward side of the tower by the control of the yaw control device when a wind speed is a predetermined value or less, and to utilize wind force through a rotation of the rotor; and a waiting mode to wait in preparation for the operation mode when a wind speed exceeds the predetermined value, wherein (1) the pitch control device includes a control operation composed of a first step of changing all the blades to be in feathering states, a third step of changing all the blades to be in reverse feathering states after the first step, and a step of holding all the blades in the reverse feathering states until a return to the operation mode after the third step, and (2) the yaw control device includes a control operation composed of a second step of controlling a yaw angle of the nacelle to be within a predetermined yaw angle range avoiding a front wind and a back wind to the rotor in synchronization with the third step, and a step of controlling a yaw brake to take a braking value allowing the yaw rotation by torque around a yaw axis, the torque loaded on the nacelle by the wind force, until a return to the operation mode after the second step, wherein the horizontal axis wind turbine executes the control operations (1) and (2) as the waiting mode.

The invention according to claim 5 is the horizontal axis wind turbine according to claim 4, wherein the predetermined yaw angle range is that of from +75 to +110 [deg] or from −75 to −110 [deg] with respect to the windward side.

The invention according to claim 6 is the horizontal axis wind turbine according to claim 4, wherein the pitch control device simultaneously changes all the blades to be in the reverse feathering states at the third step.

The invention according to claim 7 for settling the problem mentioned above is a horizontal axis wind turbine including:

a rotor including a hub and at least two blades;

a nacelle to support the rotor with a main shaft connected to the hub;

a tower to support the nacelle in a manner capable of performing a yaw rotation;

an independent pitch control device to independently control a pitch angle of each of the blades; and a yaw control device to control the yaw rotation of the nacelle, wherein the horizontal axis wind turbine is an up-wind type one including: an operation mode to put the rotor to a windward side of the tower by the control of the yaw control device when a wind speed is a predetermined value or less, and to utilize wind force through a rotation of the rotor; and a waiting mode to wait in preparation for the operation mode when a wind speed exceeds the predetermined value, wherein (1) the independent pitch control device includes a control operation composed of a first step of changing all the blades to be in feathering states when the wind speed exceeds the predetermined value, a second step of changing one blade from being in a feathering state toward a flat state after the first step and of returning the one blade to be in the feathering state after occurrence of yaw angle displacement of the nacelle, and a third step of holding all the blades to be in the feathering states until a return to the operation mode after the second step, and (2) the yaw control device includes a control operation to control a yaw brake to take a braking value allowing the yaw rotation by torque around a yaw axis, the torque loaded on the nacelle by the wind force, when the wind speed exceeds the predetermined value, wherein the yaw angle displacement of the nacelle is obtained in the second step and the third step by executing the control operation (1), and by executing the control operation (2) before executing the second step, as the waiting mode, so that the rotor is allowed to swing a leeward of the tower.

Effect of the Invention

By the invention according to claim 1, the load by a windstorm can be reduced by changing all the blades to be in the feathering states by the first step at the time of waiting in preparation for the operation of the wind turbine for the generation of electricity and the like when a wind speed exceeds the predetermined value. By this first step, the trailing edges of all the blades become the states of facing the tower side. By changing the blades to be in the reverse feathering states one by one sequentially by the second step after that, the leading edges of the blades become the states of facing the tower side. If all the blades are simultaneously reversed, then the rotor reaches over-rotation to cause an important accident. But, at the second step, the blades are changed to be in the reverse feathering states one by one sequentially. Consequently, the load by a windstorm can be suppressed to a level at which no problems are caused. Moreover, at the second step, the torque around the yaw axis, which torque is loaded on the nacelle by wind force, can be enlarged in the process of the blades' movements from the feathering states to the reverse feathering states through the flat states one by one. After that, all the blades are held in the reverse feathering states until the return of the operation mode by the third step.

On the other hand, because the yaw brake is controlled to take the braking value allowing the yaw rotation by the torque around the yaw axis, which torque is loaded on the nacelle by the wind force, the rotor can swing to the leeward of the tower by rotating the nacelle in such a way that the nacelle performs the yaw rotation by the wind force to put the rotor from the windward side of the tower to the leeward.

When the rotor is putted to the leeward of the tower, the leading edges of all the blades become the states of facing the tower side by the completion of the second step, and the states are held by the third step. Consequently, all the blades receive the wind from their leading edges, and the occurrence of the flutter can be avoided to enable the loads loaded on the blades to be reduced.

As described above, because the nacelle performs the yaw rotation by wind force to allow the rotor to swing to the leeward of the tower, the waiting form in which the rotor and the trailing edges of the blades swing to the leeward can be secured even if yaw drive means does not function, and the occurrence of the flutter is reduced by avoiding a very strong wind from the trailing edges of the blades by the waiting form. Furthermore, there can be obtained the advantage capable of reducing design loads of the blades and the like at the time of a windstorm.

In the case of executing the control operation (2) after the completion of the second step in the invention according to the claim 1, the torque around the yaw axis sufficient for rotating the nacelle is produced in some wind conditions. Consequently, the nacelle can be rotated so as to put the rotor to the leeward of the tower, and the wind turbine can be moved to its waiting posture.

In the invention according to the claim 1, preferably, the control operation (2) is executed before the execution of the second step. In the process of the second step in which the blades move from their feathering states to their reverse feathering states through their flat states one by one, the torque around the yaw axis, which torque is loaded on the nacelle by the wind force, becomes comparatively large. Accordingly, by weakening the yaw brake at this time, the nacelle can be rotated so that the rotor may more surely be putted to the leeward of the tower, and the wind turbine can be moved to the waiting posture thereof.

In the invention according to the claim 1, furthermore preferably, the control operation (2) is executed before or at the same time when the execution of the first step. Hereby, the nacelle can be rotated so that the rotor may more surely be putted to the leeward of the tower by the torque around the yaw axis, which torque is loaded on the nacelle by the wind force produced in any of the first step to the third step, and the wind turbine can be moved to the waiting posture thereof.

By the invention according to the claim 4, the load by a windstorm can be reduced by changing all the blades to be in the feathering states by the first step at the time of waiting in preparation for the operation of the wind turbine for the generation of electricity and the like when a wind speed exceeds the predetermined value. By this first step, the trailing edges of all the blades become the states of facing the tower side. By changing all the blades to be in the reverse feathering states by the third step after that, the leading edges of the blades become the states of facing the tower side.

Because the yaw angle of the nacelle is controlled to be in the predetermined yaw angle range avoiding the front wind and the back wind to the rotor in synchronization with the third step by the second step, the over-rotation of the rotor by a very strong wind and the load by the very strong wind can be avoided by the deviation of the rotation axis of the rotor from the wind direction in the pitch changing process of changing the blades from their feathering states to their reverse feathering states through their full flat states.

The predetermined yaw angle range is a range including ±90 [deg], and the range is preferably narrower range including ±90 [deg] in order to avoid a windstorm. But, if the range is too narrow, it takes a long time to converge the control. That can be realized by setting the yaw angle within, for example, the range from +75 to +115 [deg] or from −75 to −110 [deg], and sufficient windstorm avoiding effect can be obtained.

After the leading edges of the blades have become the state of facing the tower side while avoiding the very strong wind by the execution of the first to the third steps as described above, all the blades are held in their reverse feathering states until the return of the operation mode, and the yaw brake is controlled to take the braking value allowing the yaw rotation by the torque around the yaw axis, which torque is loaded on the nacelle by the wind force. Consequently, the nacelle receives a side wind or an oblique wind while the strong wind is lasting, and the torque around the yaw axis, which torque is loaded on the nacelle, is produced by the wind force, and the nacelle performs the yaw rotation so that the rotor may be putted to the leeward of the tower. Thus, the rotor can swing to the leeward of the tower.

When the rotor is putted to the leeward of the tower, all the blades receive the wind from their leading edges because the leading edges of all the blades have already been in the states of facing the tower side and the states are held. Then, the occurrence of the flutter can be avoided, and the loads loaded on the blades can be reduced.

The waiting form in which the rotor and the trailing edges of the blades swing to the leeward while avoiding the windstorm can be secured in the way mentioned above, and the occurrence of flutter can be reduced by avoiding the very strong wind from the trailing edges of the blades by the waiting form. Furthermore, there can be obtained the advantage capable of reducing design loads of the blades and the like at the time of a windstorm.

In the invention according to the claim 4, preferably, the pitch control device simultaneously changes all the blades to the reverse feathering states. The reason is that all the blades can quickly be moved to the reverse feathering states. Moreover, that can be executed even in the wind turbine that has not any independent pitch control devices and can control the pitch angles of the blades only in a lump. In this case, no complicated sequences to steer the pitch angles of respective blades are needed.

By the invention according to the claim 7, the load by a windstorm can be reduced by changing all the blades to be in the feathering states by the first step at the time of waiting in preparation for the operation of the wind turbine for the generation of electricity and the like when a wind speed exceeds the predetermined value. By this first step, the trailing edges of all the blades become the states of facing the tower side.

By the second step after that, one blade is bent from the feathering state to the flat state. By the changing of one blade, aerodynamic unbalance is produced in the rotor, and then the torque around the yaw axis, which torque is loaded on the nacelle by wind force, can be enlarged. By controlling the yaw brake to take the braking value allowing the yaw rotation by the torque, the yaw angle displacement of the nacelle can be obtained.

After that, the one blade is returned to the feathering state thereof, and all the blades are held in their feathering states until the return of the operation mode. Because the nacelle has obtained the yaw angle displacement to the wind direction by the second step and the yaw brake has been controlled to take the braking value allowing the yaw rotation by the torque around the yaw axis, which torque is loaded on the nacelle by the wind force, the rotor can be putted on the leeward side of the tower by obtaining further yaw angle displacement, and it is possible to allow the rotor to swing to the leeward of the tower.

If it is tried to reverse the nacelle from the state of being correctly positioned to the wind direction by wind force, large wind force is needed until the start of the yaw rotation of the nacelle, and the yaw rotation is started after the wind speed has become a high wind speed. Consequently, the yaw rotation becomes a sudden yaw rotation, and a large load is loaded on the wind turbine. However, according to the present invention, the nacelle is not correctly positioned to the wind direction at the time of the completion of the second step, and has obtained the yaw angle displacement. Consequently, the nacelle can obtain further yaw angle displacement by a comparatively gentle yaw rotation, and can put the rotor on the leeward side of the tower.

When the rotor has been putted to the leeward of the tower, the leading edges of all the blades become the states of facing the tower side by the completion of the second step, and the states are held by the third step. Consequently, all the blades receive a wind from their leading edges, and the lift working on the blades by the wind is considerably reduced in comparison with that of the case where the leading edges of the blades are directed to the windward side. As a result, the posture capable of performing waiting in the state in which the least loads are applied to the blades and the tower is arranged as the waiting posture at the time of a windstorm.

As described above, because the nacelle gently reverses to the leeward side by wind force and performs the yaw rotation by the wind force so as to allow the rotor to swing to the leeward of the tower also after that, the waiting form in which the rotor and the trailing edges of the blades swing to the leeward can be secured even if yaw drive means does not function, and there can be obtained the advantage capable of reducing design load of the wind turbine at the time of a windstorm by the waiting form.

BRIEF DESCRIPTION OF THE DRAWINGS

FIG. 2 is a block diagram showing the configuration of a control section to be mounted on the up-wind type horizontal axis wind turbine of the first embodiment of the present invention;

FIG. 3A is a table describing the conditions of models A, B, and C pertaining to the waiting forms of the present invention or prior art;

FIG. 3B is a table describing the conditions and the analysis results of the models A, B, and C pertaining to the waiting forms of the present invention or the prior art;

FIG. 13A is a block diagram showing the configuration of a control section to be mounted on the up-wind type horizontal axis wind turbine of the second embodiment of the present invention;

FIG. 15 is a block diagram showing the configuration of a control section to be mounted on the up-wind type horizontal axis wind turbine of the third embodiment of the present invention;

FIG. 17 is a graph showing the analysis results of yaw angles;

BEST MODE TO CARRY OUT THE INVENTION

Figure 1A:
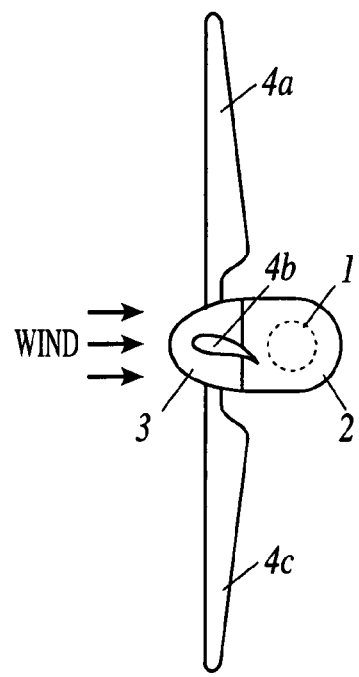
FIG. 1A is a plan view showing an up-wind type horizontal axis wind turbine of a first embodiment of the present invention when the wind turbine is seen from the upper part thereof.

In the following, embodiments of the present invention will be described with reference to the drawings. The following description pertains to the embodiments of the present invention and does not limit the present invention.

First Embodiment

An up-wind type horizontal axis wind turbine of a first embodiment of the present invention is first described.

FIG. 1 is a plan view showing the up-wind type horizontal axis wind turbine of the first embodiment of the present invention when the wind turbine is seen from the upper part thereof. FIG. 2 is a block diagram showing the parts related to the present case in the configuration of a control section mounted on the up-wind type horizontal axis wind turbine of the first embodiment of the present invention.

As shown in FIG. 1, the horizontal axis wind turbine of the present embodiment is composed of a tower 1, a nacelle 2, a hub 3, and three blades 4a-4c.

The nacelle 2 supports a rotor composed of the hub 3 and the blades 4a-4c with the main shaft (not shown) of the nacelle 2, which main shaft is connected to the hub 3. The tower 1 supports the nacelle 2 with the yaw rotation thereof being free.

Moreover, a not-shown anemometer and a not-shown anemoscope are attached on the outer surface of the nacelle 2.

Not-shown power transmission devices such as a speed-increasing gear, a generator, and the main shaft brake are housed inside the nacelle 2, and the main shaft is coupled to each of the power transmission devices.

A tip of the main shaft projects into the outside of the nacelle 2, and the rotor is attached to the tip of the main shaft in the state of rotating together with the main shaft.

The rotor includes the hub 3 coupled with the main shaft at the central part, and the three blades 4a-4c are radially attached to the circumferential surface of the hub 3 in the rotation direction thereof. Incidentally, the blade shapes of the blades 4a-4c are asymmetrically formed.

As shown in FIG. 2, the control section of the horizontal axis wind turbine of the present embodiment is composed of an anemoscope 10, an anemometer 13, a control device 16a, a pitch drive device 11, and a yaw drive device 14. The control device 16a is provided with an independent pitch control device 12a and a yaw control device 15a.

The yaw drive device 14 detects a yaw angle of the nacelle 2 to drive a yaw rotation thereof, and is provided with a not-shown yaw brake to put a brake on the yaw rotation. The yaw control device 15a gives a control signal to the yaw drive device 14 to control the yaw angle of the nacelle 2.

The pitch drive device 11 performs the independent rotation drives of the pitch angles of the blades 4a-4c. The independent pitch control device 12a gives the pitch drive device 11 a control signal to independently control each of the pitch angles of the blades 4a-4c. Each of the blades 4a-4c is independently controlled within a range of at least 180 [deg].

Incidentally, the pitch angles are attaching angles of the blades to the hub, and the angle at which the efficiency becomes the maximum is set to be 0 [deg] in the present specification.

In commercial wind force power generation, there is generally a wind speed zone suitable for generating electricity in consideration of the mechanical strength of a wind turbine, the power generation efficiency thereof, and the safety aspect thereof, and the wind turbine is controlled to wait in a posture capable of reducing the wind load thereof as much as possible without performing the generation of electricity in order to avoid a windstorm in a wind speed zone exceeding a cutout wind speed, which is the upper limit of the wind speed zone. In the following, the operation mode and the waiting mode of the horizontal axis wind turbine of the present embodiment will be described.

[Operation Mode]

In a wind speed zone suitable for the generation of electricity, the yaw control device 15a controls the rotor to put it on the windward side of the tower 1 on the basis of the wind direction detected by the anemoscope 10, and the independent pitch control device 12a controls the blades 4a-4c to take moderate pitch angles on the basis of the wind speed detected by the anemometer 13, the rotational frequency of the rotor, and the like. Then, the rotor receives a wind to rotate. The turning force of the rotor is transmitted to the main shaft connected to the hub 3, and is transmitted to the generator, which is coupled to the main shaft and housed inside the nacelle 2. Thereby, the kinetic energy generated by the rotatory motion is converted into electrical energy. When the yaw drive device 14 receives a control signal from the yaw control device 15a to rotate the nacelle 2, the yaw drive device 14 releases the yaw brake or lightens it. When the yaw drive device 14 holds the nacelle 2 in a fixed direction, the yaw drive device 14 makes the yaw brake torque maximum.

[Waiting Mode]

When it is detected by the anemometer 13 that a wind speed exceeds a cutout wind speed at the time of a windstorm, such as a typhoon, the yaw control device 15a controls the yaw brake to take a predetermined braking value allowing the yaw rotation of the nacelle 2 caused by the torque around a yaw axis, which torque is loaded on the nacelle 2 by wind force, and the independent pitch control device 12a changes all the blades 4a-4c to be in their feathering states (first step). The rotor stops, and the generation of electricity is broken.

The wind loads working on the blades 4a-4c and the tower 1 are hereby reduced. The predetermined braking value is set to be lower than the braking value at the time of holding the nacelle 2 in a fixed direction. If the predetermined braking value is set as a fixed value, then the fixed value is set to be a high value to the level at which the nacelle 2 begins to perform a violent yaw rotation at the time of supposing a wind speed exceeding the cutout wind speed. Moreover, the predetermined braking value may be the one that changes according to the yaw rotation of the nacelle 2. For example, the predetermined braking value may be changed as follows. Even if the torque around the yaw axis which torque is loaded on the nacelle 2 by wind force is small, the predetermined braking value may be set to be small in order to allow the yaw rotation of the nacelle 2. On the other hand, the predetermined braking value may be set to be large in order to limit the angular velocity of the yaw rotation of the nacelle 2 below a certain value.

Next, the independent pitch control device 12a changes each of the blades 4a-4c to be in the reverse feathering state one by one sequentially (second step).

Next, the independent pitch control device 12a holds all the blades 4a-4c in their reverse feathering states until the return of the operation mode mentioned above (third step).

The execution of the control operation mentioned above and the resultant operation of the wind turbine are here described again with reference to FIG. 1

All the blades 4a-4c are first set in their feathering states by the execution of the first step mentioned above as shown in FIG. 1A, and the rotation of the rotor stops. Moreover, the yaw brake takes the aforesaid predetermined braking value to allow the yaw rotation.

If the torque around the yaw axis which torque is loaded on the nacelle 2 by wind force is larger than the yaw brake torque at this time, then the nacelle 2 begins to move. If the torque is smaller than the yaw brake torque, then the nacelle 2 continues to stop at a fixed angle.

Figure 1B:
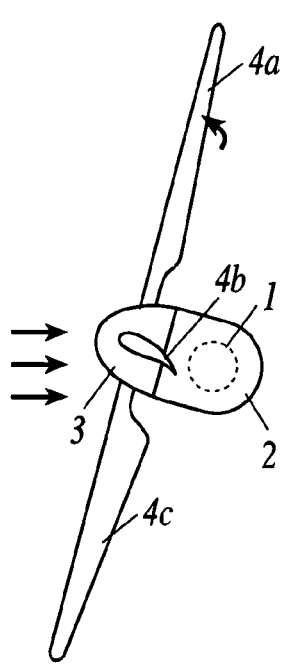
FIG. 1B is a plan view showing the up-wind type horizontal axis wind turbine of the first embodiment of the present invention when the wind turbine is seen from the upper part thereof.

Next, the wind turbine enters into the second step. A blade 4a is first started in order to reverse the pitch angle thereof as shown in FIG. 1B. The torque around the yaw axis becomes larger to take a peak value at the time point when the pitch angle of the blade 4a passes a flat angle. Also the turning force of the rotor becomes large by the occurrence of lift in the blade 4a in the changing process of the blade 4a, but the other two blades 4b and 4c, which keep their feathering states, effectively apply braking power to the rotation of the rotor. Consequently, even if no other main shaft braking means is used, no rotations of the rotor are violently brought about.

Figure 1C:
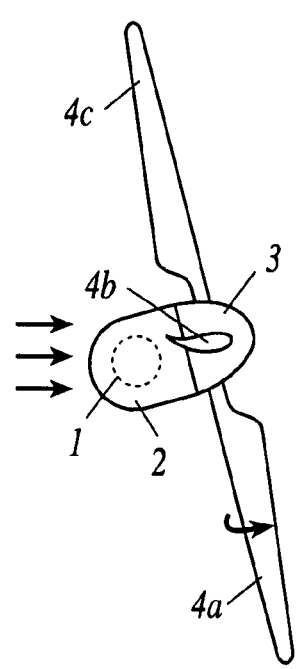
FIG. 1C is a plan view showing the up-wind type horizontal axis wind turbine of the first embodiment of the present invention when the wind turbine is seen from the upper part thereof.

Furthermore, the blade 4a is bent to be in the reverse feathering state as shown in FIG. 1C, and the blade 4a is held in the state of the reverse feathering from that time on until the return of the operation mode.

If it is supposed that the yaw rotation of the nacelle 2 is started by the changing process of the blade 4a, the nacelle 2 performs the yaw rotation, for example, as shown in FIGS. 1B to 1C, and the rotor is putted on the leeward side of the tower 1.

Figure 1D:
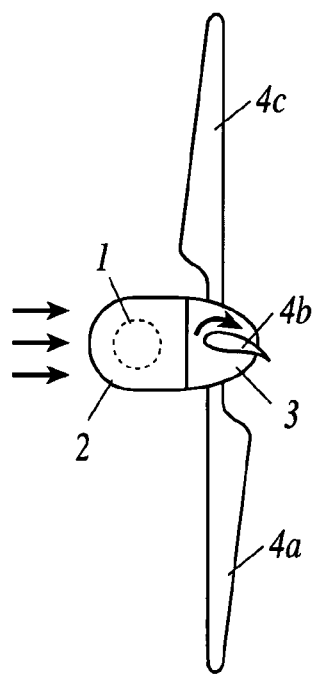
FIG. 1D is a plan view showing the up-wind type horizontal axis wind turbine of the first embodiment of the present invention when the wind turbine is seen from the upper part thereof.

Next, a second blade 4b is bent from feathering state thereof into the reverse feathering state thereof similarly to the first blade 4a, and the second blade 4b is held in the state of the reverse feathering from that time on until the return of the operation mode (FIG. 1D).

Figure 1E:
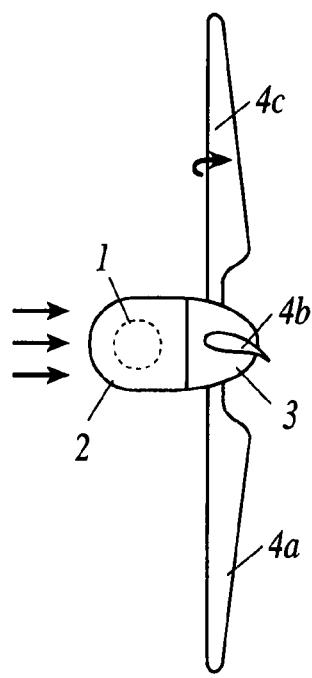
FIG. 1E is a plan view showing the up-wind type horizontal axis wind turbine of the first embodiment of the present invention when the wind turbine is seen from the upper part thereof.

Next, a third blade 4c is bent from the feathering state thereof to the reverse feathering state thereof similarly to the first and second blades 4a and 4b, and the third blade 4c is held in the reverse feathering from that time on until the return of the operation mode (FIG. 1E).

Even if the yaw rotation of the nacelle 2 is not started in the changing process of the first blade 4a, there is a chance of making the nacelle 2 perform the yaw rotation in the processes of changing the second and third blades 4b and 4c from their feathering states to their reverse feathering states, and consequently the state shown in FIG. 1E, that is, the waiting posture in which the rotor is putted to the leeward of the tower 1 and the leading edges of all the blades 4a-4c face the windward side, can be finally secured with high certainty.

Because the yaw brake is set to take the predetermined braking value to allow the yaw rotation mentioned above, the nacelle 2 slides around the yaw axis according to the changes of the wind direction, and the rotor is allowed to swing the leeward of the tower.

All the blades 4a-4c receives the wind from their leading edges in the waiting mode while the windstorm is lasting. Then, the occurrence of flutter can be avoided, and the loads to be loaded on the blades 4a-4c can be reduced.

As described above, because the nacelle 2 performs a yaw rotation by wind force to allow the rotor to swing to the leeward of the tower 1 in the horizontal axis wind turbine of the present embodiment, the waiting form of the wind turbine, in which the rotor and the trailing edges of the blades swing to the leeward, can be secured even if the yaw drive means does not function. The occurrence of the flutter can be reduced by avoiding very strong winds from the trailing edges of the blades by the waiting form, and furthermore the design loads of the blades and the like at the time of a windstorm can be reduced.

Because the rotor takes the waiting form of swinging to the leeward, the nacelle 2 performs the yaw rotation so that the rotor is always situated on the leeward side even if the wind direction changes. Consequently, the loads working on the blades 4a-4c and the tower 1 can be reduced by being let to slip. Hence, for example, also at the time of a windstorm, such as a typhoon, the rotor is always putted on the leeward side of the tower 1 without requiring special control means for keeping the posture of the horizontal axis wind turbine, and the loads applied by a wind can be suppressed to be the minimum ones. Furthermore, thereby, the design strength of the horizontal axis wind turbine can be considerably lightened; flexibility of designing can be raised; and the reduction of costs can be achieved.

Moreover, according to the horizontal axis wind turbine of the present embodiment, the drag that is caused by a wind to work on each of the blades 4a-4c can first be reduced by setting the pitch angles of all the blades 4a-4c to the feathering states at the time of a windstorm, such as a typhoon. As a result, the loads working on the blades 4a-4c and the tower 1 can be reduced.

Moreover, because the pitch angle of each of the blades 4a-4c, which have been changed to the feathering sates, is sequentially changed to reverse feathering one by one by the independent pitch control device 12a, the increases of the loads working on the blades 4a-4c and the tower 1 can be suppressed to the minimum in comparison with those in the case where all the blades are simultaneously reversed. As a result, it is possible to prevent the generation of undue drag and lift on the blades 4a-4c, and to effectively prevent the over-rotations of the rotor.

Second Embodiment

Next, the up-wind type horizontal axis wind turbine of the second embodiment of the present invention is described.

FIG. 12 is a plan view showing the up-wind type horizontal axis wind turbine of the second embodiment of the present invention when the wind turbine is seen from the upper part thereof.

As shown in FIG. 12, the horizontal axis wind turbine of the present embodiment includes the tower 1, the nacelle 2, the hub 3, and three blades 4a-4c.

The nacelle 2 supports the rotor composed of the hub 3 and the blades 4a-4c with the main shaft (not shown) of the nacelle 2, which main shaft is connected to the hub 3. The tower 1 supports the nacelle 2 with the yaw rotation thereof being free.

Moreover, a not-shown anemometer and a not-shown anemoscope are attached on the outer surface of the nacelle 2.

Not-shown power transmission devices such as the speed-increasing gear, the generator, and the main shaft brake are housed inside the nacelle 2, and the main shaft is coupled to each of the power transmission devices.

A tip of the main shaft projects into the outside of the nacelle 2, and the rotor is attached to the tip of the main shaft in the state of rotating together with the main shaft.

The rotor includes the hub 3 coupled with the main shaft at the central part, and the three blades 4a-4c are radially attached to the circumferential surface of the hub 3 in the rotation direction thereof. Incidentally, the blade shapes of the blades 4a-4c are asymmetrically formed.

FIG. 13A is a block diagram showing the parts related to the present case in the configuration of the control section mounted on the up-wind type horizontal axis wind turbine of the present embodiment.

As shown in FIG. 13A, the control section of the horizontal axis wind turbine of the present embodiment is composed of the anemoscope 10, the anemometer 13, a control device 16b, the pitch drive device 11, and the yaw drive device 14. The control device 16b is provided with a pitch control device 12b and a yaw control device 15b.

The yaw drive device 14 detects the yaw angle of the nacelle 2 to drive a yaw rotation, and is provided with a not-shown yaw brake to put a brake on the yaw rotation. The yaw control device 15b gives a control signal to the yaw drive device 14 to control the yaw angle of the nacelle 2.

The pitch drive device 11 performs the rotation drives of the pitch angles of the blades 4a-4c. The pitch control device 12b gives the pitch drive device 11 a control signal to control the pitch angles of the blades 4a-4c. Each of the blades 4a-4c is freely controlled within a range of at least 180 [deg].

The pitch control of the blades 4a-4c may be that capable of independently controlling each of the blades or that capable of controlling all the blades only in a lump. The pitch control of the blades 4a-4c is unnecessary to be able to be controlled independently to each blade, and it is enough to be able to control all the blades in a lump as long as the blades can rotate in the range of 180 [deg]. In the latter case, the configurations of the machine and the control device are simplified. There is no doubt that the pitch control may be that capable of independently controlling to each of the blades.

Figure 13B:
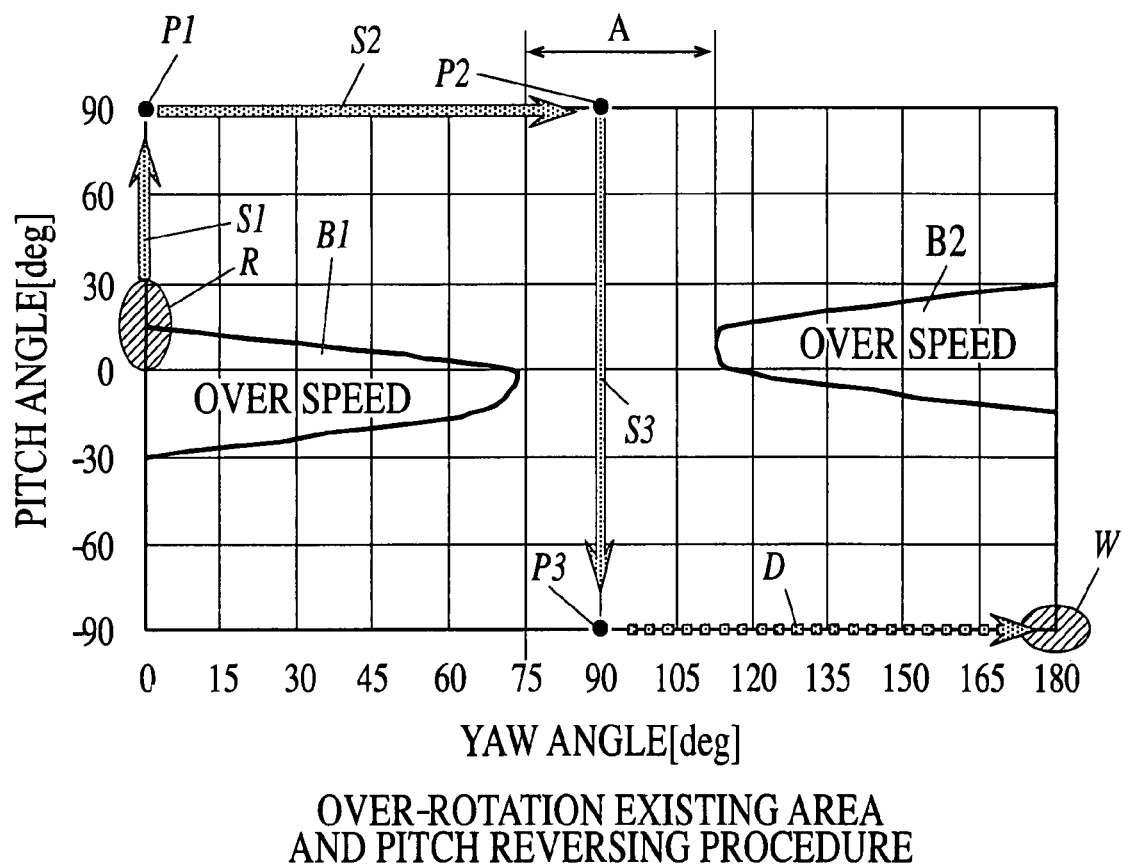
FIG. 13B is a view showing over-rotation existing areas and control steps for avoiding the over-rotation existing areas on yaw angle-pitch angle plane coordinates.

FIG. 13B is a diagram showing over-rotation existing areas on yaw angle-pitch angle plane coordinates and the control steps of avoiding this. As shown in FIG. 13B, over-rotation existing areas B1 and B2 in which the rotor reaches the rotation of 20 [rpm] or more under the wind condition of 40 [m/sec] of a wind speed are distributed on the plane coordinates having the abscissa axis thereof indicating yaw angles and the ordinate axis thereof indicating pitch angles. A range from +75 [deg] to +110 [deg] or from −75 [deg] to −110 [deg], which range avoids the over-rotation existing areas B1 and B2, is determined as a yaw angle range A on the basis of FIG. 13B, and the waiting mode is executed as follows in the present embodiment. In the yaw angle range A, no pitch angle reaches the over-rotation.

Incidentally, the trailing edges of the blades 4a-4c face the side of the tower 1 at the pitch angle of 90 [deg], and the leading edges of them face the side of the tower 1 at the pitch angle of −90 [deg]. The rotor is situated on the windward side of the tower 1 at the yaw angle of 0 [deg] and receives a wind from the front thereof.

In commercial wind force power generation, there is generally a wind speed zone suitable for generating electricity in consideration of the mechanical strength, the power generation efficiency, and the safety aspect, and the wind turbine is controlled to wait in a posture capable of reducing the wind load thereof as much as possible without performing the generation of electricity in order to avoid a windstorm in a wind speed zone exceeding a cutout wind speed, which is the upper limit of the wind speed zone. In the following, the operation mode and the waiting mode of the horizontal axis wind turbine of the present embodiment will be described.

[Operation Mode]

In the wind speed zone suitable for the generation of electricity, the yaw control device 15b controls the rotor to putted it on the windward side of the tower 1 on the basis of the wind direction detected by the anemoscope 10, and the pitch control device 12b controls the blades 4a-4c to take moderate pitch angles on the basis of the wind speed detected by the anemometer 13, the rotational frequency of the rotor, and the like. Then, the rotor receives a wind to rotate. The turning force of the rotor is transmitted to the main shaft connected to the hub 3, and is transmitted to the generator, which is coupled to the main shaft and housed inside the nacelle 2. Thereby, the kinetic energy generated by the rotatory motion is converted into electrical energy. When the yaw drive device 14 receives a control signal from the yaw control device 15b to rotate the nacelle 2, the yaw drive device 14 releases the yaw brake or lightens it. When the yaw drive device 14 holds the nacelle 2 in a fixed direction, the yaw drive device 14 makes the yaw brake torque maximum.

The existing area of the pitch angles and the yaw angles in the operation mode of an up wind wind turbine is almost set as an operation area R in FIG. 13B.

[Waiting Mode]

When it is detected by the anemometer 13 that a wind speed exceeds the cutout wind speed (for example, 25 [m/sec]) at the time of a windstorm, such as a typhoon, the pitch control device 12b changes all the blades 4a-4c to their feathering states (first step S1). The rotor stops, and the generation of electricity is broken. The wind loads working on the blades 4a-4c and the tower 1 are hereby reduced.

Next, the yaw control device 15b rotates the nacelle 2 to change a fixed angle in the yaw angle range A, and holds the yaw angle of the nacelle 2 to the fixed angle with the yaw brake (second step S2).

Next, the pitch control device 12b changes all the blades 4a-4c to their reverse feathering states simultaneously in the state in which the yaw angle of the nacelle 2 is held in the yaw angle range A (third step S3).

The pitch control device 12b holds all the blades 4a-4c in their reverse feathering states until the return of the operation mode mentioned above after the third step S3. The yaw control device 15b controls the yaw brake to take a braking value (braking power) allowing the yaw rotation caused by the torque around the yaw axis to be loaded on the nacelle 2 by wind force until the return of the operation mode mentioned above after the second step S2.

The braking value is set to be lower than the one at the time of holding the nacelle 2 in the fixed direction. Moreover, the braking value is set to be a high value in the degree of preventing an excessive yaw rotation of the nacelle 2 at the time of supposing a wind having a wind speed exceeding the cutout wind speed. The braking value may be the one changing according to the yaw rotation of the nacelle 2. For example, the braking value may be change as follows: the braking value is made to be small in order to allow the yaw rotation of the nacelle 2 even if the torque around the yaw axis is small, which torque is loaded on the nacelle 2 by wind force; on the other hand, the braking value is made to be large in order to limit the angular velocity of the yaw rotation of the nacelle 2 below the certain value.

The execution of the control operation mentioned above and the resultant operation of the wind turbine are here described again with reference to FIG. 12.

All the blades 4a-4c are first set in their feathering states by the execution of the first step S1 mentioned above as shown in FIG. 12A, and the rotation of the rotor stops.

Figure 12A:
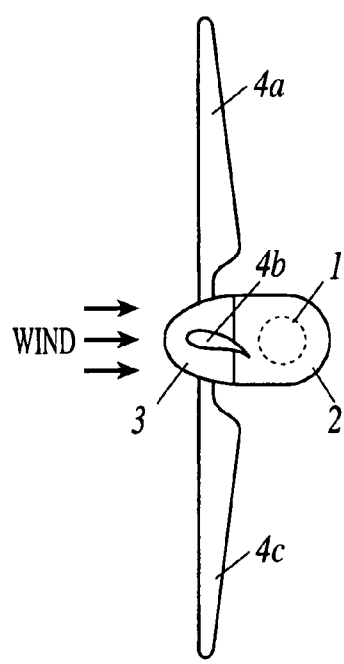
FIG. 12A is a plan view showing an up-wind type horizontal axis wind turbine of a second embodiment of the present invention when the wind turbine is seen from the upper part thereof.
Figure 12B:
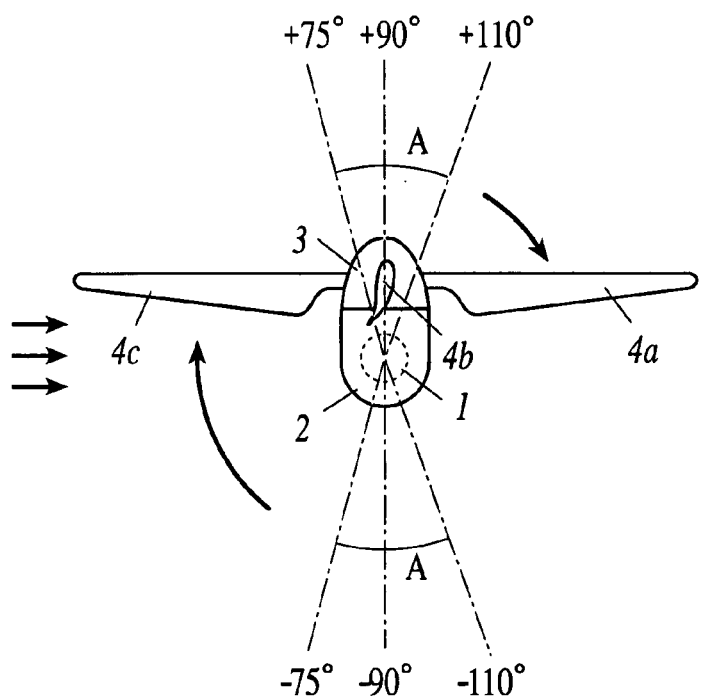
FIG. 12B is a plan view showing the up-wind type horizontal axis wind turbine of the second embodiment of the present invention when the wind turbine is seen from the upper part thereof.

Next, the wind turbine takes the posture shown in FIG. 12B by the second step S2. That is, the wind turbine takes the posture in which the yaw angle of the nacelle 2 becomes almost 90 [deg] to a wind direction and the rotation surface of the rotor is substantially parallel to the wind direction. If the pitches of the blades are changed, large lift is not produced in this posture. The nacelle 2 may be rotated either of the sides in the second step S2. The FIG. 12B shows the state of rotating the nacelle 2 in the clockwise direction when the nacelle 2 is seen from the sky to keep the rotation within the yaw angle range A from +75 [deg] to +110 [deg]. It may be previously set to rotate the nacelle 2 into the clockwise direction or into the counterclockwise direction, but it is preferable to determine the rotation direction by selecting the one capable of shifting the nacelle 2 into the yaw angle range A for the shortest time at the time of starting the second step S2.

Figure 12C:
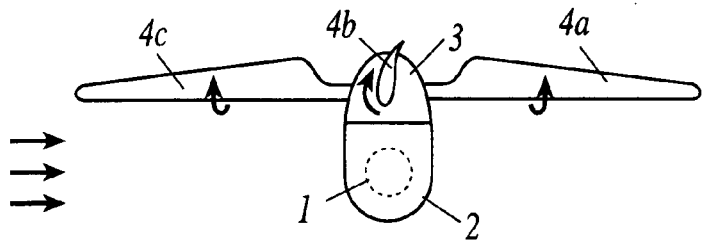
FIG. 12C is a plan view showing the up-wind type horizontal axis wind turbine of the second embodiment of the present invention when the wind turbine is seen from the upper part thereof.

Next, the blades 4a-4c are simultaneously bent into the reverse feathering states as shown in FIG. 12C by the third step. No large lift is produced in this process, and it is possible to change the blades 4a-4c to the reverse feathering states safely without producing any over-rotations of the rotor.

Figure 12D:
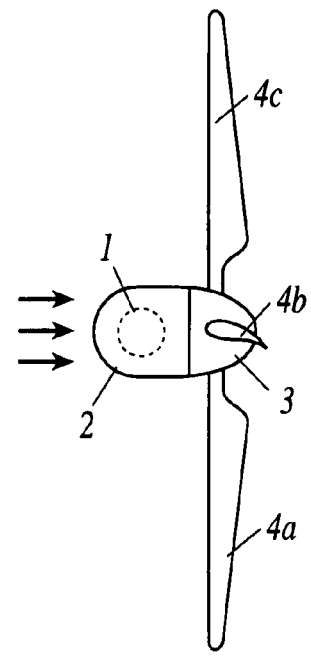
FIG. 12D is a plan view showing the up-wind type horizontal axis wind turbine of the second embodiment of the present invention when the wind turbine is seen from the upper part thereof.

After that, the states of the reverse feathering are held until the return of the operation mode mentioned above, and the yaw brake is controlled to take the braking value allowing the yaw rotations caused by the torque around the yaw axis, which torque is loaded on the nacelle 2 by wind force. If the torque around the yaw axis, which torque is loaded on the nacelle 2 by the wind force, is larger than the yaw brake torque, then the nacelle 2 rotates, and the rotor is putted on the leeward side of the tower 1 as shown in FIG. 12D and the rotor is allowed to swing the leeward side of the tower 1. The waiting form such that the rotor and the trailing edges of the blades 4a-4c swing to the leeward can hereby secured, and the waiting form can reduce the occurrence of the flutter by avoiding a very strong wind from the trailing edges of the blades and further can reduce the design loads of the blades and the like at the time of a windstorm.

It is possible to perform the waiting of the nacelle 2 without performing the yaw rotation thereof by setting the braking value of the yaw brake to be comparatively high in the case where the load of the yaw torque by a wind is comparatively small even if the speed of the wind exceeds the cutout wind speed. In this case, if the wind direction does not change, the waiting state shown in FIG. 12C is kept. No over-rotations of the rotor are produced also in this case, and the load to the wind turbine is suppressed to be small because the wind speed is comparatively low. Even if the wind direction changes with the nacelle 2 not following the wind direction, the rotor does not enter the over-rotation existing areas B1 and B2, as it is known by referring to the FIG. 13B. Consequently, no over-rotations of the rotor are caused, and the load to the wind turbine is suppressed to be small because the wind speed is comparatively low.

On the other hand, it is possible to making the nacelle 2 perform waiting in the mode of the nacelle 2 following the wind direction by setting the braking value of the yaw brake to be comparatively low if the wind speed exceeds the cutout wind speed.

When the anemometer 13 detects a wind speed equal to the cutout wind speed or less for a predetermined period, the wind turbine returns to the operation mode thereof. The yaw control device 15b rotates the nacelle 2 to face the rotor toward the windward side. For example, if the wind turbine is in the state of the FIG. 12D at the time of returning to the operation mode, the yaw control device 15b first rotates the nacelle 2 by 180 [deg] to face the rotor toward the windward side. Moreover, for example, if the wind turbine is in the state of the FIG. 12C at the time of returning to the operation mode, the yaw control device 15b first rotates the nacelle 2 by 90 [deg] into the counterclockwise direction to face the rotor toward the windward side.

Furthermore, a description is added with reference to the yaw angle-pitch angle plane coordinates of the FIG. 13B.

The coordinates (yaw angle, pitch angle) are almost in the operation area R in the operation mode. The coordinates move to a point P1 or the circumference thereof by the execution of the first step S1 of the waiting mode. Because the first step S1 can reduce the wind load to the rotor in a moment, it is preferable to immediately execute the first step S1 with the detection of the cutout wind speed as a trigger.

Next, the coordinates move to a point P2 or the circumference thereof by the execution of the second step S2. It is also possible by the execution of the second step S2 from the operation area R to depart from the over-rotation existing area B1 as it can be known by referring to the FIG. 13B. Although the present embodiment adopts the control flow to start the second step S2 after the end of the first step S1, the control flow is not restricted to this. Also the second step S2 may be immediately executed with the detection of the cutout wind speed as a trigger. That is, the control flow may be the one including a period in which both of the first step S1 and the second step S2 simultaneously advance by starting both the steps S1 and S2 simultaneously, or by starting the second step S2 before the completion of the first step S1.

Next, the coordinates move to a point P3 or the circumference thereof by the execution of the third step S3. At this time, it is important not to enter the over-rotation existing areas B1 and B2, and it is important to make a detour distant from the over-rotation existing areas B1 and B2 as far as possible. It is the synchronization of the second step S2 and the third step S3 that realizes it. In the present embodiment, the nacelle 2 is rotated to a certain angle of a target in the yaw angle range A by the changing process of the first half of the second step S2, and the angle of the nacelle 2 is fixed to the certain angle and is held at the angle with the yaw brake by the holding process of the second half. The control flow of executing the whole third step S3 during the holding process is adopted. The second step S2 is set to end at the same time as the completion of the third step S3 or after the completion to weaken the yaw brake. Moreover, the yaw angle range A is set as a fixed range independent of the pitch angle. According to the present embodiment, it is possible to move to the point P3 or the circumference thereof by making a detour distant to be far from the over-rotation existing areas B1 and B2, and consequently the present embodiment is a preferable one.

Relating to the above, the third step S3 may be executed during the change of the yaw angle by the second step S2, or the yaw angle and the pitch angle may simultaneously be bent to control them in order to select a region outside the over-rotation existing areas B1 and B2 (and a region in which the rotation of the rotor is more weakened). Moreover, the yaw angle range A may be determined so as to be widen or narrowed according to the pitch angle. The second step S2 may be ended shortly before the completion of the third step S3 to weaken the yaw brake. The necessary thing is to move the yaw angle and the pitch angle from the point P1 or the circumferential region thereof to the point P3 or the circumferential region thereof, avoiding (preferably to be distant from as far as possible) the over-rotation existing areas B1 and B2, and the movement is not limited to that of the present embodiment. The path preferably passes through right in the middle of the over-rotation existing area B1 and the over-rotation existing area B2 in the area between them.

After that, the yaw brake is controlled to take the braking value allowing the yaw rotations by the torque around the yaw axis, which torque is loaded on the nacelle 2 by wind force. If the torque around the yaw axis, which torque is loaded on the nacelle 2 by the wind force, is larger than the yaw brake torque, then the nacelle 2 rotates as shown by an arrow D in the FIG. 13B, and the rotor is putted to the leeward. If a strong wind rotating the nacelle 2 continues, then the rotor is allowed to swing the leeward, and the coordinates of the wind turbine is almost in a waiting region W if the position is expressed on the FIG. 13B. The wind turbine waits the stop of the windstorm in such a waiting form.

As described above, according to the horizontal axis wind turbine of the present embodiment, the waiting form in which the rotor and the trailing edges of the blades swing to the leeward while avoiding a windstorm can be secured even if the wind turbine has no independent pitch control device and no complicated steering sequence. The occurrence of flutter can be reduced by avoiding a very strong wind from the trailing edges of the blades by the waiting form, and the design loads of the blades and the like at the time of a windstorm can be reduced.

Because the wind turbine takes the waiting form in which the rotor is allowed to swing the leeward at the time of a windstorm, the nacelle 2 performs a yaw rotation so that the rotor is situated on the leeward side even if the wind direction has changed. Consequently, the load of the wind turbine can be reduced while the loads working on the blades 4a-4c and the tower 1 are let to be slipped. Hence, for example, at the time of a windstorm, such as a typhoon, the rotor is putted on the leeward side of the tower 1 without requiring special control means for keeping the posture of the horizontal axis wind turbine, and consequently the load applied by a wind can be suppressed to be the minimum one. Furthermore, the design strength of the horizontal axis wind turbine can hereby be considerably lightened, and flexibility of design can be raised. The reduction of the cost can also be achieved.

Moreover, according to the horizontal axis wind turbine of the present embodiment, for example, at the time of a windstorm, such as a typhoon, the drag that is caused by a wind and works on each of the blades 4a-4c can first be reduced by changing the pitch angles of all the blades 4a-4c to the state of feathering. As a result, the loads working on the blades 4a-4c and the tower 1 can be reduced.

Moreover, because the pitch angles of the blades 4a-4c are simultaneously changed to the reverse feathering after the blades 4a-4c, which have been changed to the feathering states by the pitch control device 12b, have been moved in a predetermined yaw angle range in which the front wind and the back wind to the rotor are avoided, the risk of the working of excessive loads on the blades 4a-4c and the tower 1 can be avoided more certainly in comparison with the case where all the blades are simultaneously reversed in the state of having the possibility that the rotor receives the front wind or the back wind without performing such yaw control. As a result, the occurrence of undue drag and lift to the blades 4a-4c can be prevented, and the over-rotations of the rotor can effectively be prevented.

Third Embodiment

Next, the up-wind type horizontal axis wind turbine of the third embodiment of the present invention is described.

FIG. 14 is a plan view showing the up-wind type horizontal axis wind turbine of the third embodiment of the present invention when the wind turbine is seen from the upper part thereof. FIG. 15 is a block diagram showing the configuration of a control section mounted on the up-wind type horizontal axis wind turbine of the third embodiment of the present invention.

As shown in the FIG. 14, the horizontal axis wind turbine of the present embodiment is composed of the tower 1, the nacelle 2, the hub 3, and three blades 4a-4c.

The nacelle 2 supports a rotor composed of the hub 3 and the blades 4a-4c with the main shaft (not shown) of the nacelle 2, which main shaft is connected to the hub 3. The tower 1 supports the nacelle 2 with the yaw rotation thereof being free.

Moreover, a not-shown anemometer and a not-shown anemoscope are attached on the outer surface of the nacelle 2.

Not-shown power transmission devices such as a speed-increasing gear, a generator, and a main shaft brake are housed inside the nacelle 2, and the main shaft is coupled to each of the power transmission devices.

A tip of the main shaft projects into the outside of the nacelle 2, and the rotor is attached to the tip of the main shaft in the state of rotating together with the main shaft.

The rotor includes the hub 3 coupled with the main shaft at the central part, and the three blades 4a-4c are radially attached to the circumferential surface of the hub in the rotation direction thereof. Incidentally, the blade shapes of the blades 4a-4c are asymmetrically formed.

As shown in FIG. 15, the control section of the horizontal axis wind turbine of the present embodiment is composed of the anemoscope 10, the anemometer 13, a control device 16c, the pitch drive device 11, and the yaw drive device 14. The control device 16c is provided with an independent pitch control device 12c and a yaw control device 15c.

The yaw drive device 14 detects the yaw angle of the nacelle 2 to drive a yaw rotation, and is provided with a not-shown yaw brake to put a brake on the yaw rotation. The yaw control device 15c gives a control signal to the yaw drive device 14 to control the yaw angle of the nacelle 2.

The pitch drive device 11 performs the independent rotation drives of the pitch angles of the blades 4a-4c. The independent pitch control device 12c gives the pitch drive device 11 a control signal to independently control each of the pitch angles of the blades 4a-4c. Each of the blades 4a-4c is independently freely controlled within a range of at least 180 [deg].

In commercial wind force power generation, there is generally a wind speed zone suitable for generating electricity in consideration of the mechanical strength of a wind turbine, the power generation efficiency thereof, and the safety aspect thereof, and the wind turbine is controlled to wait in a posture capable of reducing the wind load thereof as much as possible without performing the generation of electricity in order to avoid a windstorm in a wind speed zone exceeding a cutout wind speed, which is the upper limit of the wind speed zone. In the following, the operation mode and the waiting mode of the horizontal axis wind turbine of the present embodiment will be described.

[Operation Mode]

In a wind speed zone suitable for the generation of electricity, the yaw control device 15c controls the rotor to put it on the windward side of the tower 1 on the basis of the wind direction detected by the anemoscope 10, and the independent pitch control device 12c controls the blades 4a-4c to take moderate pitch angles on the basis of the wind speed detected by the anemometer 13, the rotational frequency of the rotor, and the like. Then, the rotor receives a wind to rotate. The turning force of the rotor is transmitted to the main shaft connected to the hub 3, and is transmitted to the generator, which is coupled to the main shaft and housed inside the nacelle 2. Thereby, the kinetic energy generated by the rotatory motion is converted into electrical energy. When the yaw drive device 14 receives a control signal from the yaw control device 15c to rotate the nacelle 2, the yaw drive device 14 releases the yaw brake or lightens it. When the yaw drive device 14 holds the nacelle 2 in a fixed direction, the yaw drive device 14 makes the yaw brake maximum.

[Waiting Mode]

(First Step)

When it is detected by the anemometer 13 that a wind speed exceeds a cutout wind speed at the time of a windstorm, such as a typhoon, the independent pitch control device 12c changes all the blades 4a-4c to the feathering states. The wind loads working on the blades 4a-4c and the tower 1 are hereby reduced. The rotor stops, and the generation of electricity is broken.

(Second Step)

Next, the yaw control device 15c controls the yaw brake to take a predetermined braking value allowing the nacelle 2 to perform a yaw rotation by the torque around the yaw axis, which torque is loaded on the nacelle 2 by wind force. The independent pitch control device 12c changes the blade 4a from feathering state thereof to the flat side thereof.

The predetermined braking value is set to be lower than the braking value at the time of holding the nacelle 2 in a fixed direction. If the predetermined braking value is set as a fixed value, then the fixed value is set to be a high value to the level at which the nacelle 2 does not perform a violent yaw rotation at the time of supposing a wind having a wind speed exceeding the cutout wind speed. Moreover, the predetermined braking value may be the one that changes according to the yaw rotation of the nacelle 2. For example, the predetermined braking value may be changed as follows. Even if the torque around the yaw axis, which torque is loaded on the nacelle 2 by wind force, is small, the predetermined braking value may be made to be small in order to allow the yaw rotation of the nacelle 2. On the other hand, the predetermined braking value may be large in order to limit the angular velocity of the yaw rotation of the nacelle 2 below a certain value.

The angle after changing in the case where the blade 4a has been bent from the feathering state thereof to the flat side thereof is about flat (0 [deg]) to 45 [deg]. The angle influences obtained yaw angle displacement.

When about the 30 [deg] of yaw angle displacement is produced on the basis of the yaw angle of the nacelle 2 detected by the yaw control device 15c, the independent pitch control device 12c returns the blade 4a to be in the feathering state thereof.

It is preferable to obtain the yaw angle displacement of about 30 [deg] or more. The reason is as follows. That is, large wind force is needed until the start of a yaw rotation of the nacelle if it is tried to reverse the nacelle by wind force from the state thereof of being correctly positioned into the wind direction, and the yaw rotation is started after the wind speed becomes high. Consequently, the yaw rotation becomes a sudden one, and a large load is loaded on the wind turbine.

An angle after the changing in the case of changing the blade 4a from the feathering state thereof to the flat side in order to obtain about 30 [deg] or more of the yaw angle displacement and a braking value to allow the yaw rotation of the nacelle 2 are set.

(Third Step)

Next, all the blades 4a-4c are held in their reverse feathering states until the return of the operation mode mentioned above.

The execution of the control operation mentioned above and the resultant operation of the wind turbine are here described with reference to FIG. 14 again.

All the blades 4a-4c are first set in their feathering states by the execution of the first step mentioned above as shown in FIG. 14A, and the rotation of the rotor stops.

Figures 14A, 14B, 14C:
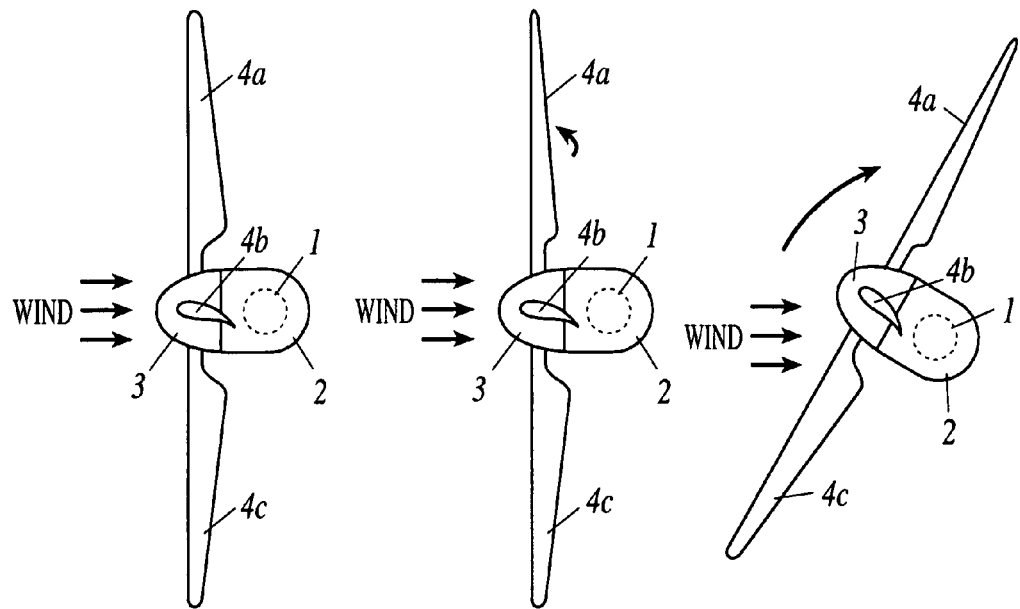
FIG. 14A is a plan view showing an up-wind type horizontal axis wind turbine of a third embodiment of the present invention when the wind turbine is seen from the upper part thereof.
FIG. 14B is a plan view showing the up-wind type horizontal axis wind turbine of the third embodiment of the present invention when the wind turbine is seen from the upper part thereof.
FIG. 14C is a plan view showing the up-wind type horizontal axis wind turbine of the third embodiment of the present invention when the wind turbine is seen from the upper part thereof.

Next, the control operation enters the second step. The yaw brake is controlled to take the predetermined braking value to allow the yaw rotation of the nacelle 2. The blade 4a is raised to the flat side as shown in FIG. 14B, and the torque around the yaw axis becomes larger. Although the turning force of the rotor also becomes large by the production of lift of the blade 4a caused by the changing of the blade 4a to the flat side, the other two blades 4b and 4c, which keep the state of feathering, apply braking power to the rotation of the rotor. Consequently, even if no other main shaft braking means is used, no violent rotations of the rotor are caused.

The nacelle 2 obtains the yaw angle displacement of about 40 to 80 [deg] to the wind direction as shown in FIG. 14C by the changing of the blade 4a to the flat side and the yaw brake control. Supposing that the wind direction is fixed, the yaw angle at this time to the wind direction will be referred to as "initial yaw angle."

Figures 14D, 14E:
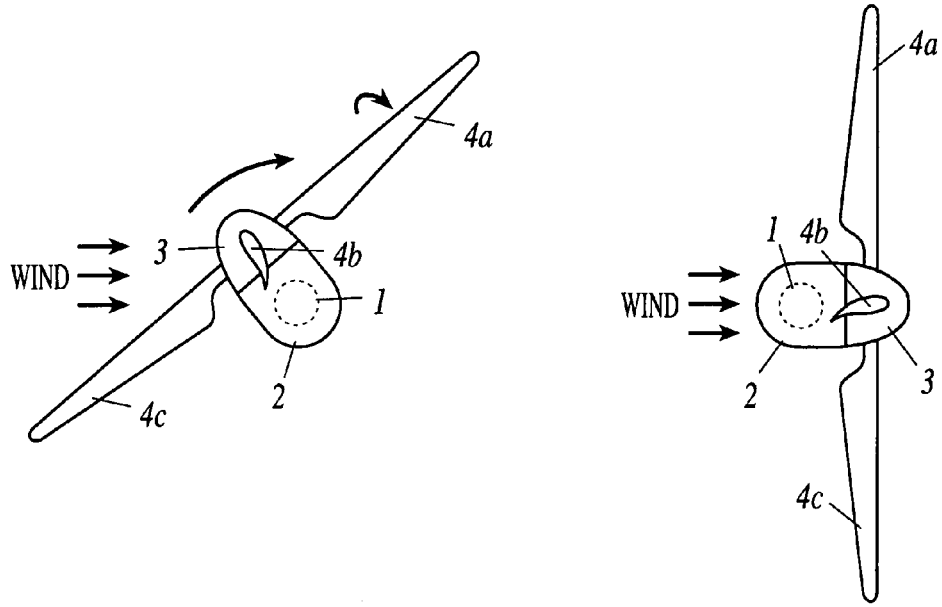
FIG. 14D is a plan view showing the up-wind type horizontal axis wind turbine of the third embodiment of the present invention when the wind turbine is seen from the upper part thereof.
FIG. 14E is a plan view showing the up-wind type horizontal axis wind turbine of the third embodiment of the present invention when the wind turbine is seen from the upper part thereof.

Next, the blade 4a is returned to the feathering state thereof as shown in FIG. 14D. After that, all the blades 4a-4c are held in their feathering states until the return of the operation mode. At this time, because of the initial yaw angle, yaw torque is loaded on the nacelle 2. Moreover, because the yaw brake allows the yaw rotations of the nacelle 2, further yaw angle displacement is obtained, so that the rotor is putted on the leeward side of the tower 1 as shown in FIGS. 14D to 14E.

Because the yaw brake is being set to take the predetermined braking value allowing the yaw rotations mentioned above during the waiting mode after that, the nacelle 2 slides around the yaw axis according to the changes of the wind direction, and the rotor is allowed to swing the leeward of the tower.

All the blades 4a-4c receives a wind from their trailing edges in the waiting mode while the windstorm is lasting, and the lift working on them by the wind is considerably reduced in comparison with that in the case where the leading edges of the blades are directed to the windward side. As a result, the posture capable of waiting in the state of loading the minimum loads onto the blades 4a-4c and the tower 1 is arranged as the waiting posture at the time of a windstorm.

As described above, because the nacelle 2 performs a yaw rotation by wind force to allow the rotor to swing to the leeward of the tower 1 in the horizontal axis wind turbine of the present embodiment, the waiting form of the wind turbine, in which the rotor and the leading edges of the blades swing to the leeward, can be secured even if no yaw drive means functions. The design loads of a wind turbine at the time of a windstorm can be reduced by the waiting form.

Because the rotor takes the waiting form of swinging to the leeward, the nacelle 2 performs the yaw rotations thereof so that the rotor is always situated on the leeward side even if the wind direction changes. Consequently, the loads working on the blades 4a-4c and the tower 1 can be reduced by being let to slip. Hence, for example, at the time of a windstorm, such as a typhoon, the rotor is always putted on the leeward side of the tower 1 without requiring special control means for keeping the posture of the horizontal axis wind turbine, and the loads applied by a wind can be suppressed to be the minimum ones. Furthermore, thereby, the design strength of the horizontal axis wind turbine can be considerably lightened; flexibility of designing can be raised; and the reduction of costs can be achieved.

Moreover, according to the horizontal axis wind turbine of the present embodiment, the drag that is caused by a wind to work on each of the blades 4a-4c can first be reduced by setting the pitch angles of all the blades 4a-4c to the feathering states at the time of a windstorm, such as a typhoon. As a result, the loads working on the blades 4a-4c and the tower 1 can be reduced.

EXAMPLE 1

Models A, B, and C having the considerably fallen rigidity of blades were produced as to a wind turbine having a diameter of 80 m (corresponding to 2 MW), which does not produce any flutter generally, in order to verify the production of the flutter in the waiting form and the like on the supposition of the enlargement of the blades in size. The conditions and the waiting postures of the models A, B, and C were described in the tables shown in FIG. 3.

Figure 4:
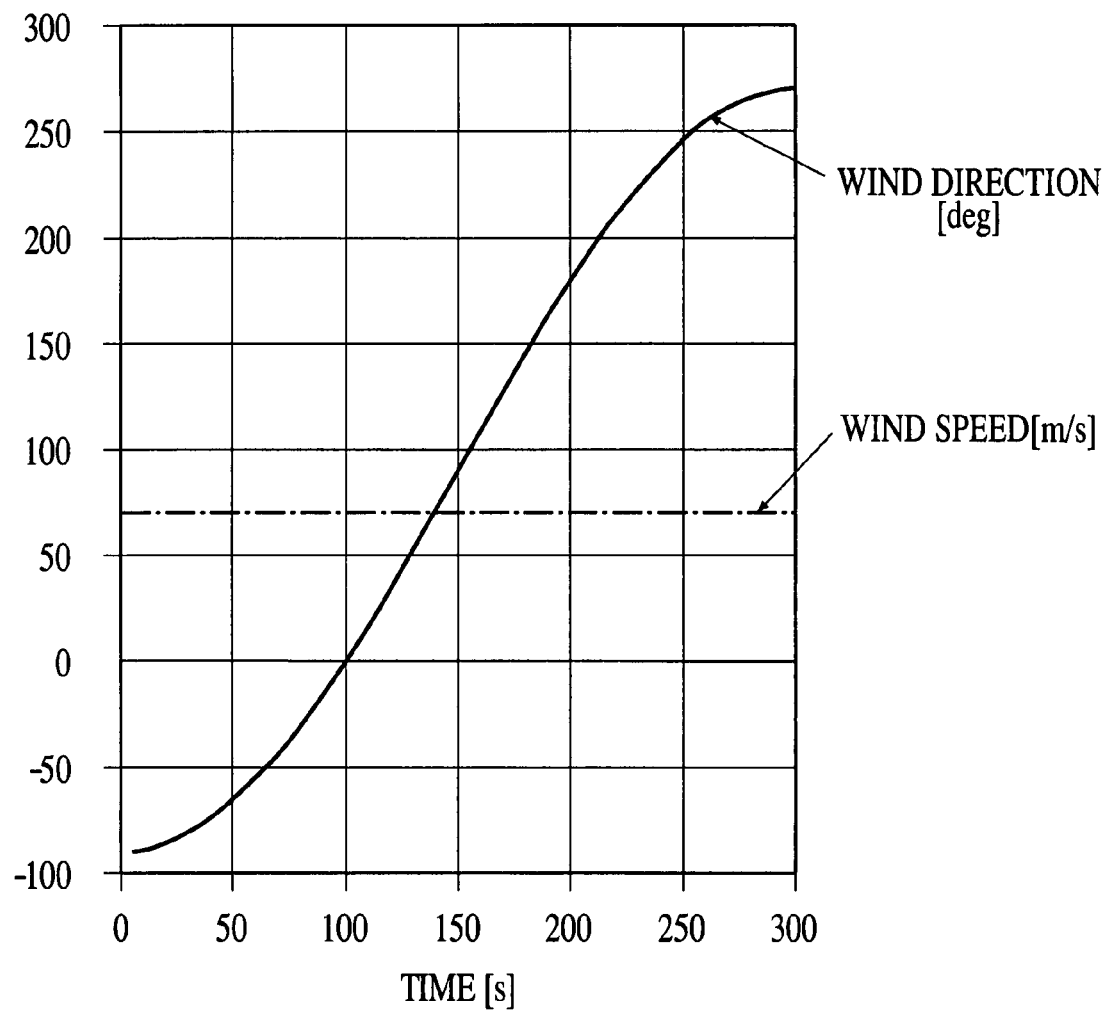
FIG. 4 is a graph showing wind conditions pertaining to analysis conditions.

The nacelle azimuthal angles (FIG. 5), the rotation speeds of the rotors (FIG. 6), the torsion displacement of the blades (FIG. 7), the blade root flap bending (FIG. 8), the blade root torque (FIG. 9), the yaw torque (FIG. 10), and the yaw horizontal force (FIG. 11) of each of the models A, B, and C under the wind conditions shown in FIG. 4 were analyzed, and were output as graphs. Moreover, the gist, the distribution ranges, and the evaluations of the analysis results were described in the tables shown in FIG. 3.

As also described in the tables shown in FIG. 3, the model A corresponded to the waiting form of the prior art 2. The model B was the waiting form of an example of the third embodiment of the present invention, and the waiting forms of the prior art 3 and 5 corresponded to this. The model C was the waiting form of the examples of the first and second embodiments of the present invention, and the waiting forms of the prior art 4 and 6 also corresponded to this.

The model C, which was the waiting form of the examples of the first and second embodiments of the present invention, had the good load reducing effects as for the flap bending/torsion of the blades and yaw horizontal force. Moreover, also the yaw torque was considerably improved in comparison with that of the general up-wind machine (model A).

In the following, the evaluation to each item is tried.

Figure 5:
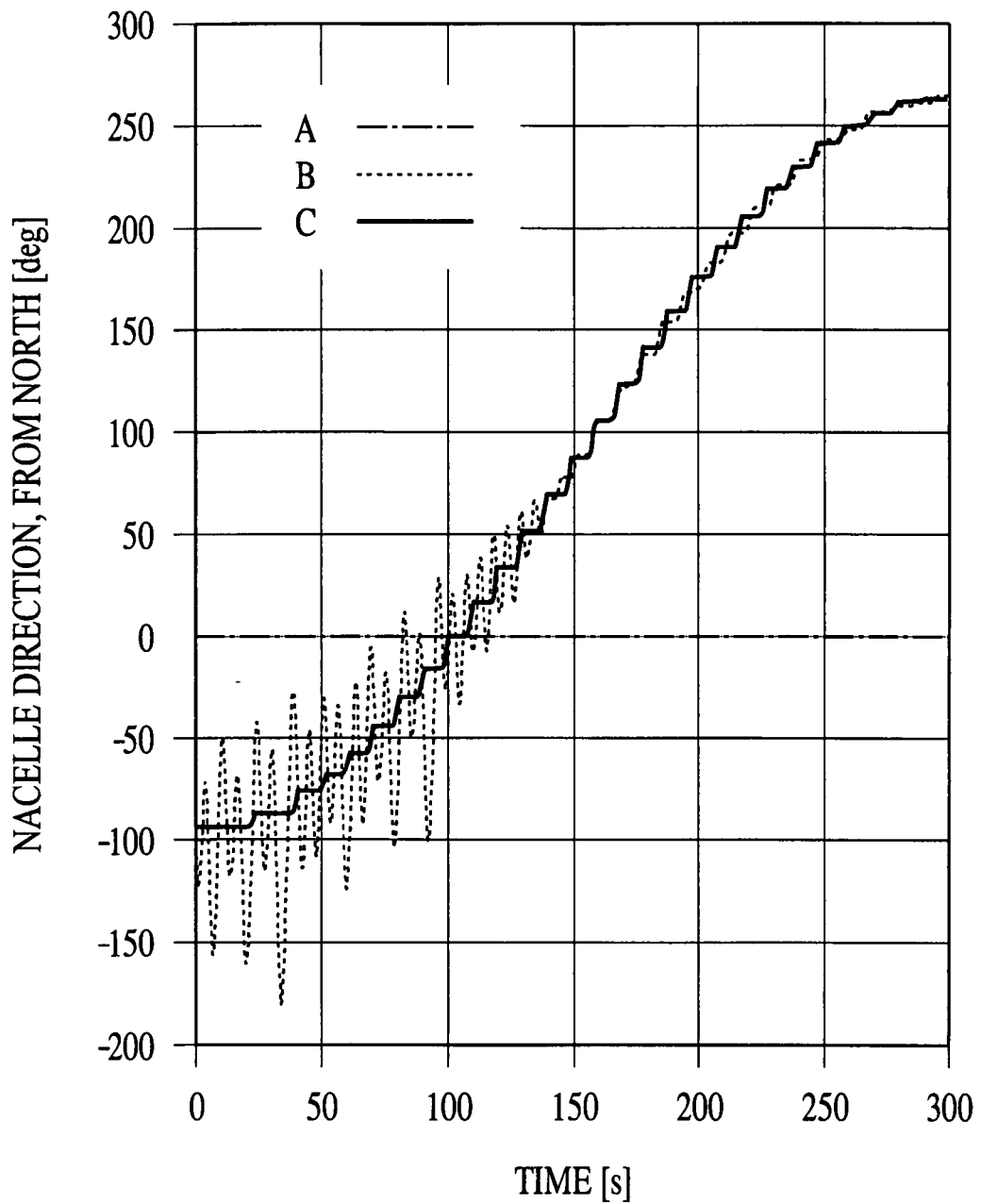
FIG. 5 is a graph showing the analysis results of nacelle azimuthal angles.

(1) Nacelle Azimuthal Angle (See FIG. 5)

The models B and C, which basically allow yaw rotation, followed the wind direction. The model B, in which the trailing edges faced the windward side, there were the vibrations of the blades in the first half part (0-150 [sec]), and the yaw was also swung by those.

Figure 6:
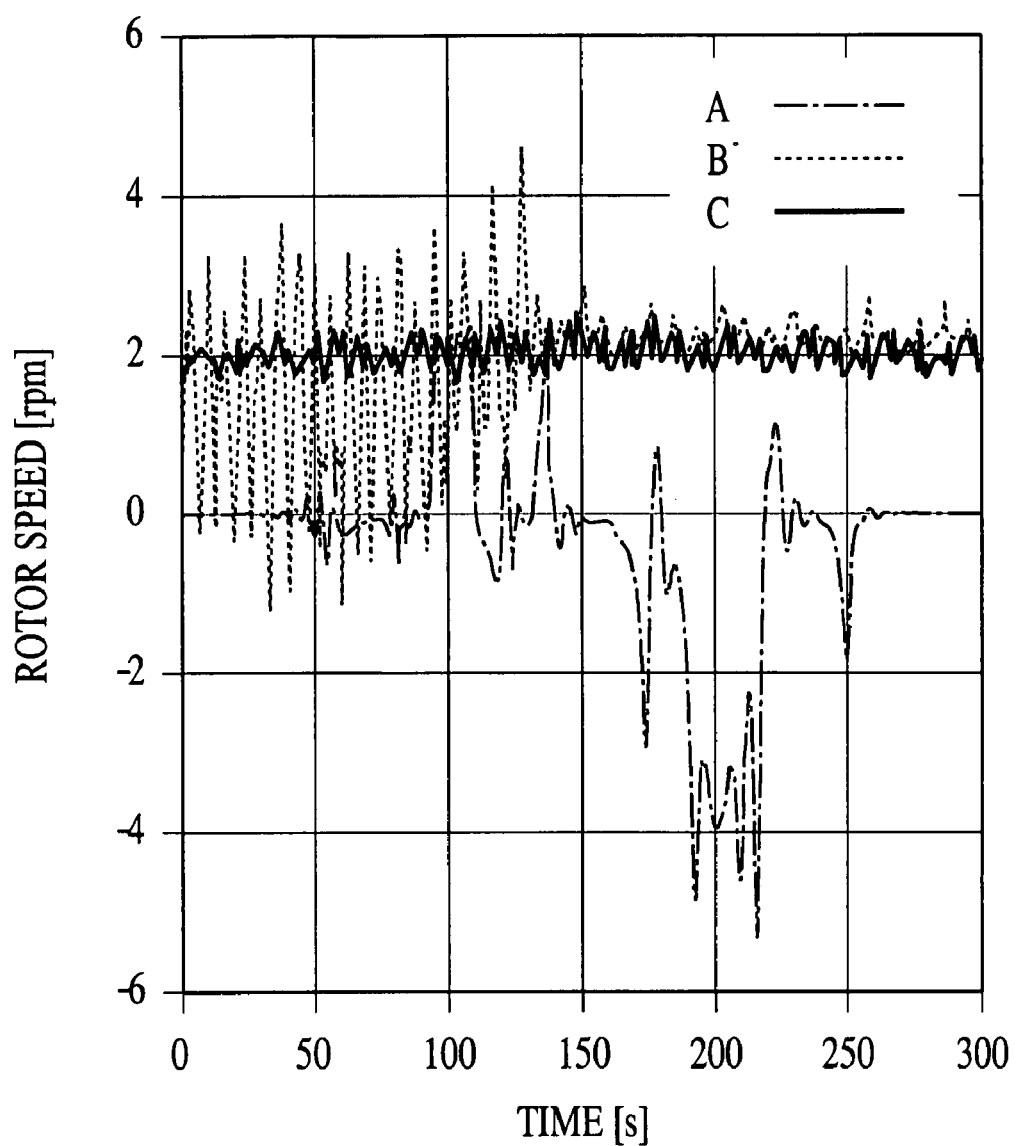
FIG. 6 is a graph showing the analysis results of rotation speeds of rotors.

(2) Rotation Speed (See FIG. 6)

The rotors of the models B and C, which allow yaw rotation, were basically slowly freely rotating. In the model B, the trailing edges thereof faced the windward side, there were the vibrations of the blades in the first half part (0-150 [sec]), and the rotor thereof was also swung by those.

Figure 7:
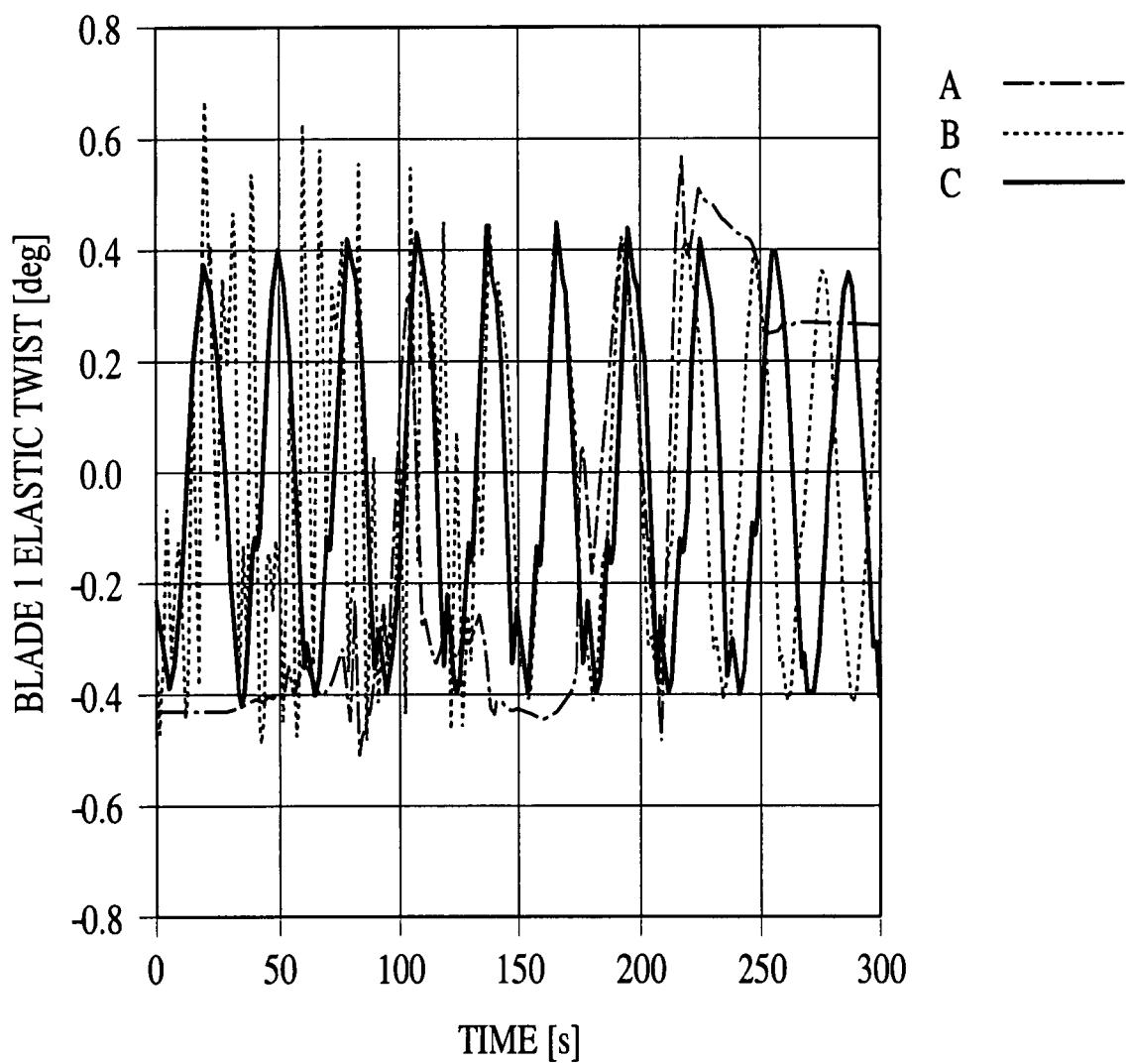
FIG. 7 is a graph showing the analysis results of the torsion displacement of blades.

(3) Torsion Displacement of Blade (See FIG. 7)

Almost the same evaluation as that of the blade root torque could be applied.

Figure 8:
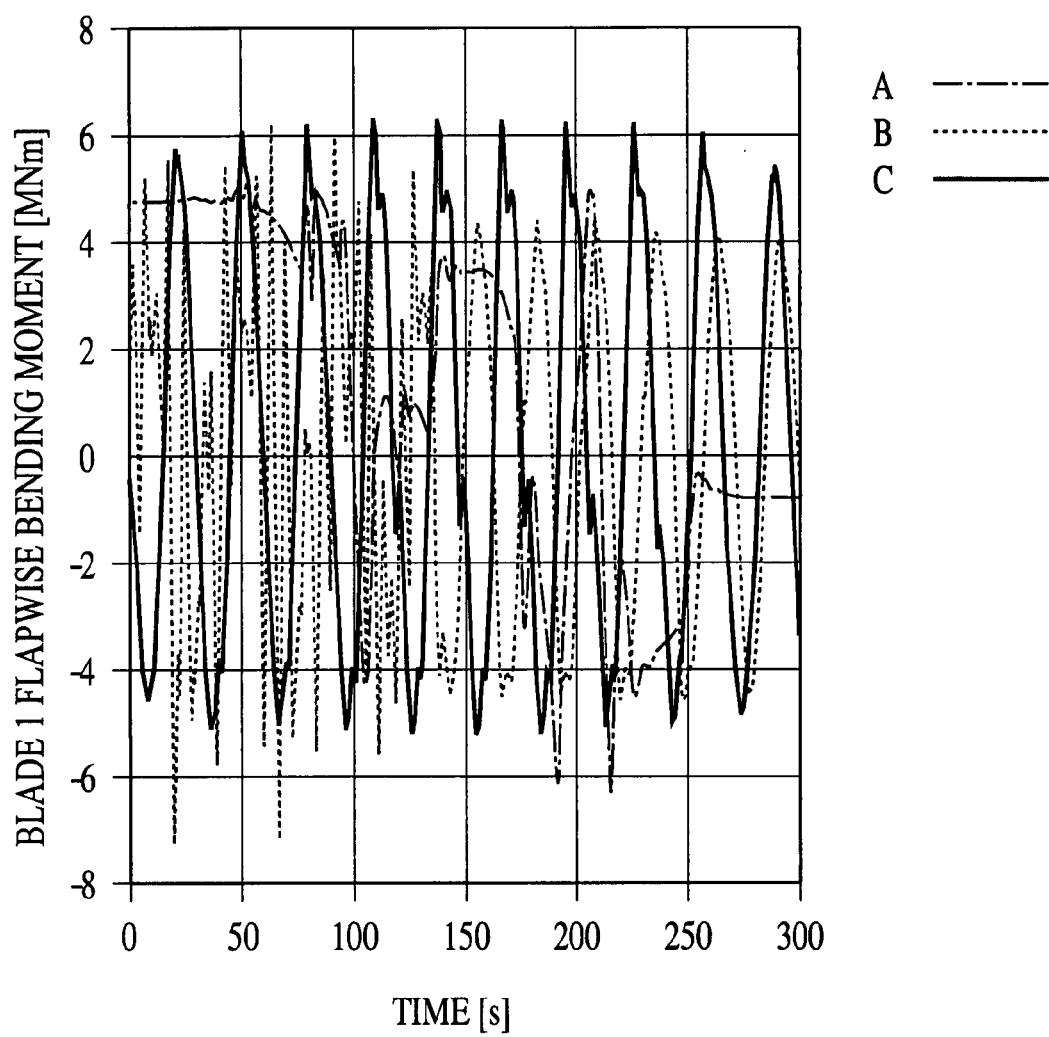
FIG. 8 is a graph showing the analysis results of blade root flap bendings.

(4) Blade Root Flap Bending (See FIG. 8)

There was generally the rocking of loads accompanying the rotations of the rotors. The first half part (0-150 [sec]) of the model B vibrated at a short period.

Figure 9:
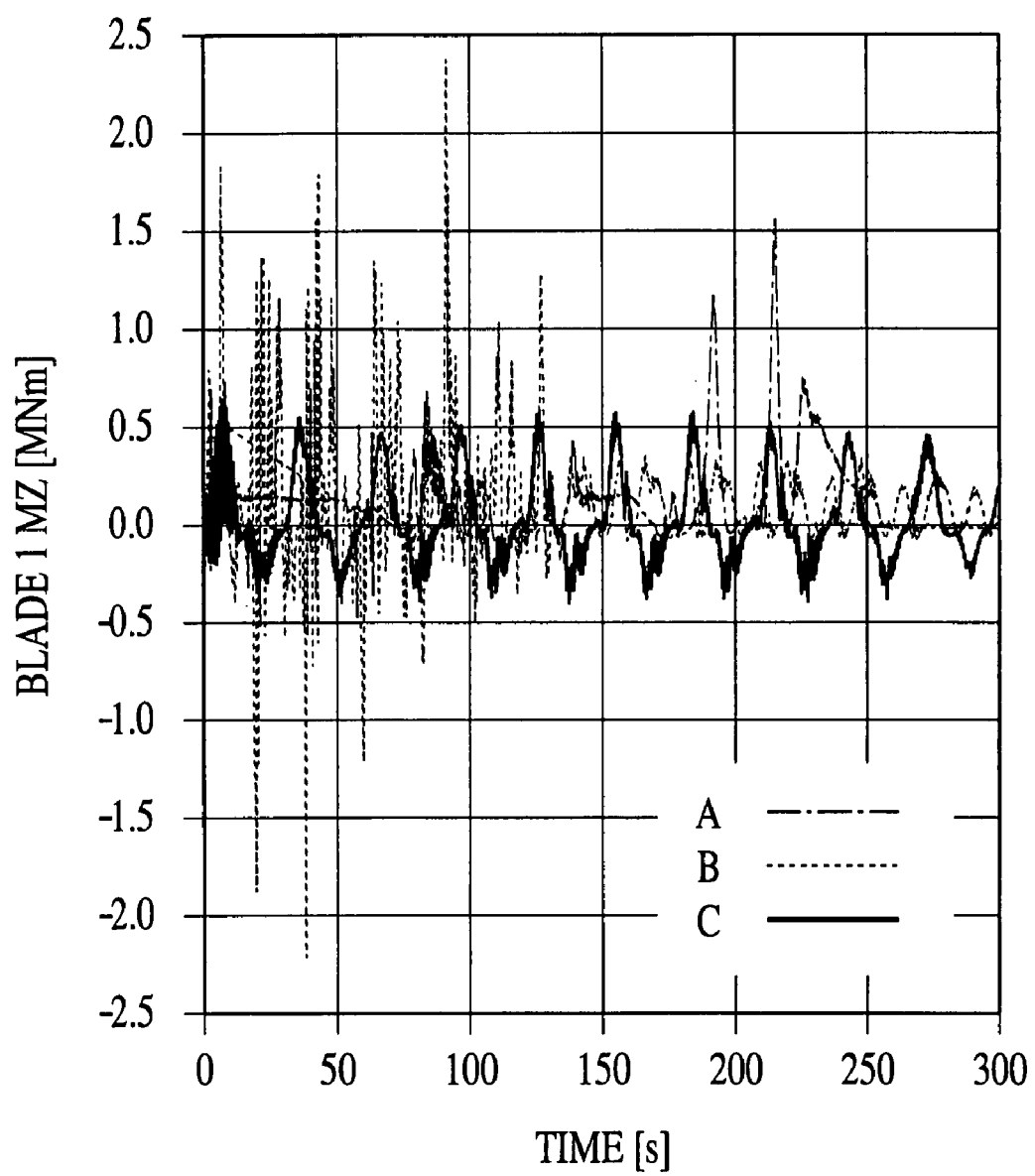
FIG. 9 is a graph showing the analysis result of blade root torque.

(5) Blade Root Torque (See FIG. 9)

There was generally rocking accompanying the rotations of the rotors. Large torque was produced in the case where the models received a windstorm from the trailing edges of the rotors, such as the case of the first half part (0-150 [sec]) of the model B and the neighborhood of 200 seconds of the model A. Because generally it could not be allowed for safety reasons that a pitch mechanism was twisted back, it was necessary to design the pitch mechanism and the structure of a blade to be the ones withstanding this.

Figure 10:
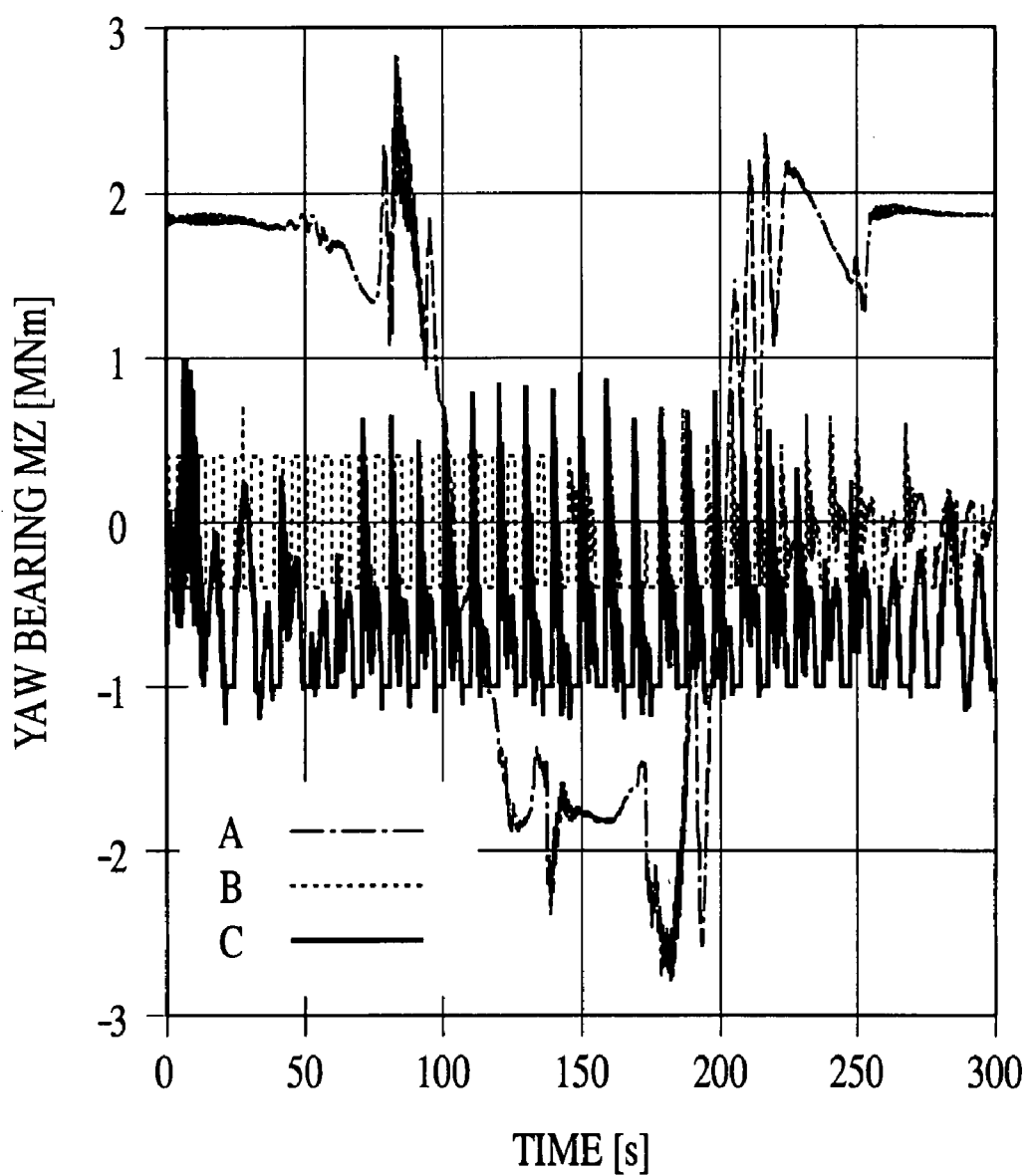
FIG. 10 is a graph showing the analysis results of yaw torque.

(6) Yaw Torque (See FIG. 10)

In the case of the models B and C, which allow yaw rotation, the amplitude of yaw torque was limited to be small. In the case where the amplitude deviated from this, loads were let to slip by sliding the yaws. In the models B and C, the loads were considerably reduced in comparison with the model A, which held the yaw thereof.

Figure 11:
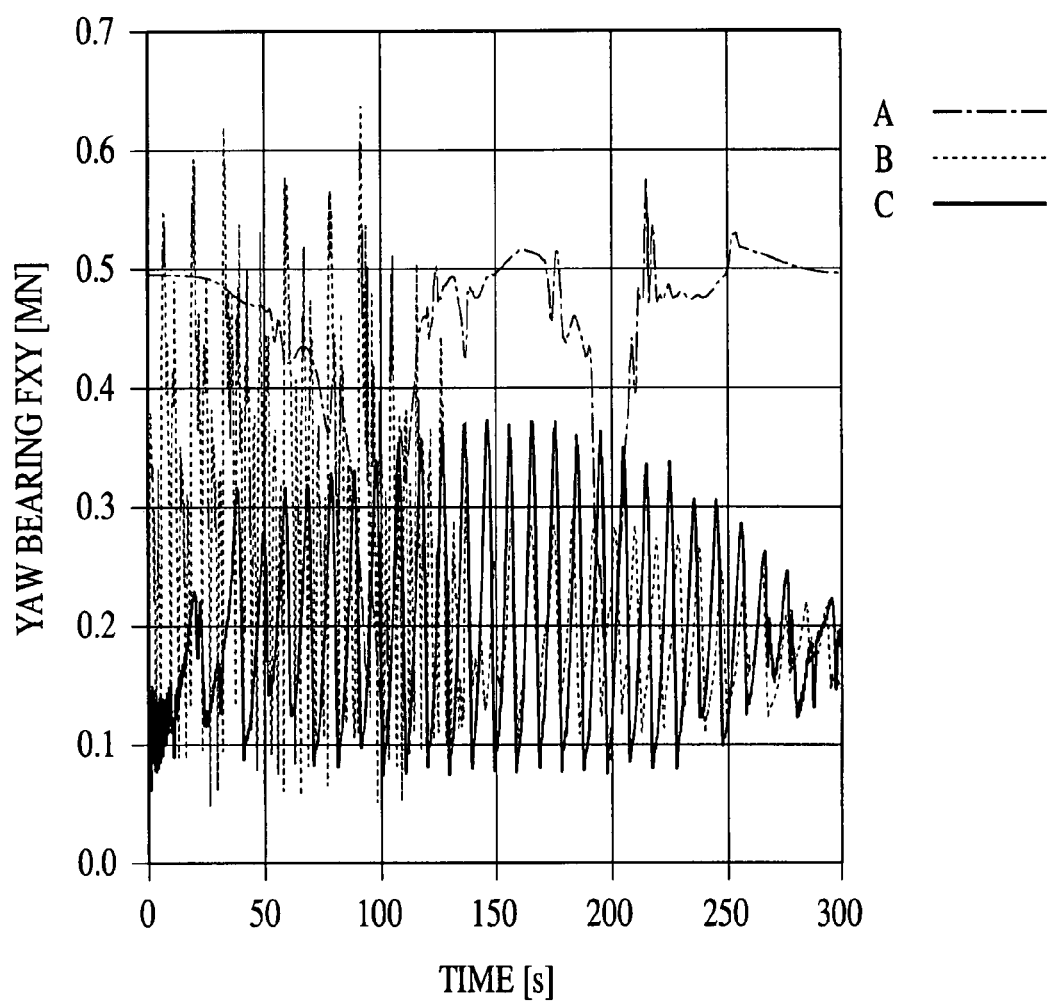
FIG. 11 is a graph showing the analysis results of yaw horizontal force.

(7) Yaw Horizontal Force (See FIG. 11)

The yaw horizontal force greatly contributed to the designs of the tower and the basis thereof. The models B and C, which allow yaw rotation, basically had a tendency to reduce their loads. In the model B, which received a wind from the trailing edges thereof, large vibrations were produced, and the loads were adversely increased. The adverse tendency could be seen at the time when the blade rigidity was remarkably low.

EXAMPLE 2

The following analyses (1) and (2) of an independent pitch control up-wind type horizontal axis wind turbine having three blades and a rotor the diameter of which is 80 meters were performed.

(1) Analysis of Behavior to Initial Yaw Angles

The changes of yaw angle, bending moment, and yaw horizontal force that were produced under a specific wind condition were analyzed by changing the initial yaw angle $\theta y0$ variously. The wind condition applied for the present analysis was shown in FIG. 16. The wind condition was the one in which the wind direction was fixed and the wind speed changed within a range from 10 [m/s] to 70 [m/s] for 60 seconds.

Four kinds of initial yaw angles of 5, 15, 30, and 45 [deg] were set as the initial yaw angles $\theta y0$. All the blades were in feathering states (pitch angles: about 86 [deg]), and yaw brake torque was 400 [kNm].

Figure 16:
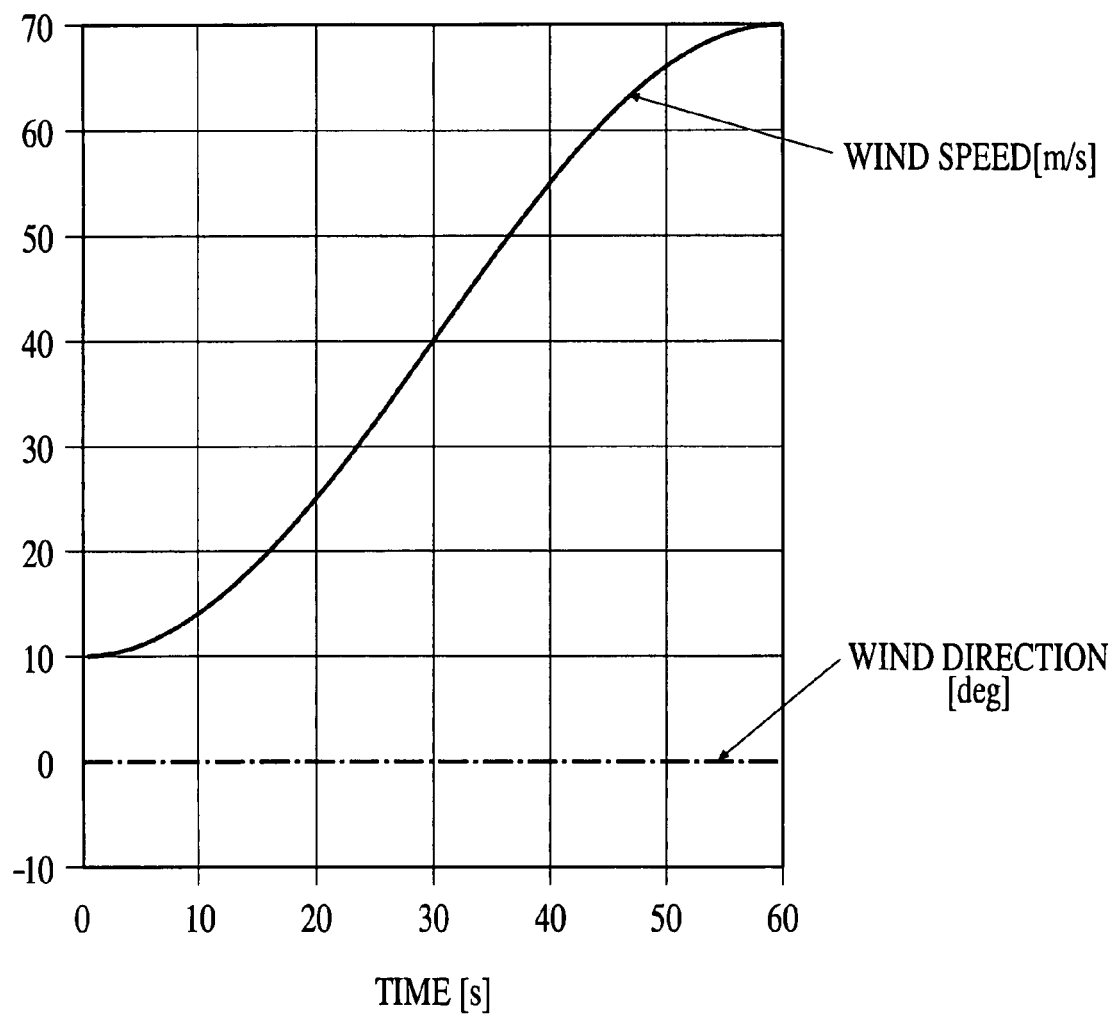
FIG. 16 is a graph showing wind conditions pertaining to analysis conditions.
Figure 18:
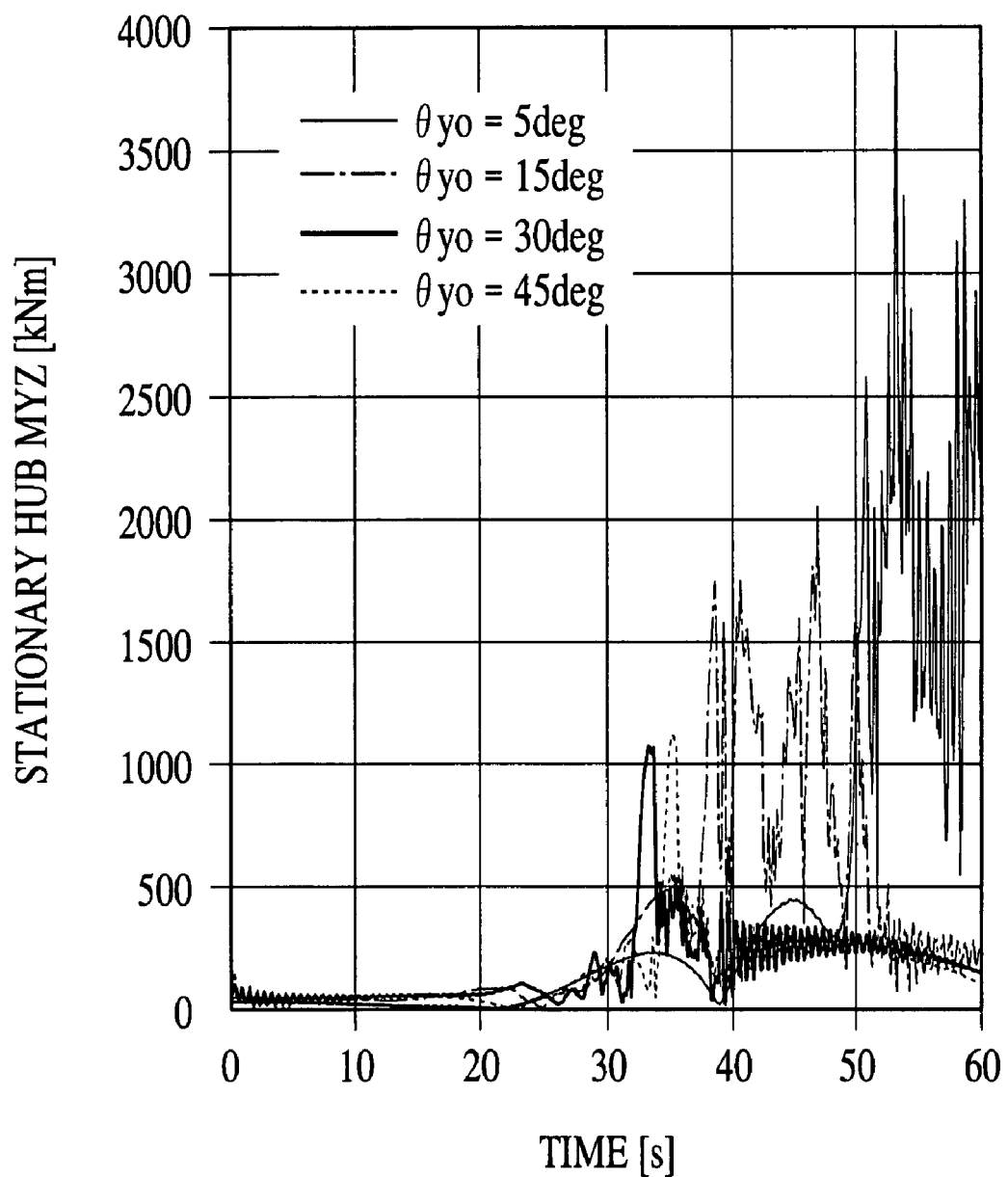
FIG. 18 is a graph showing the analysis results of bending moments of a rotor.
Figure 19:
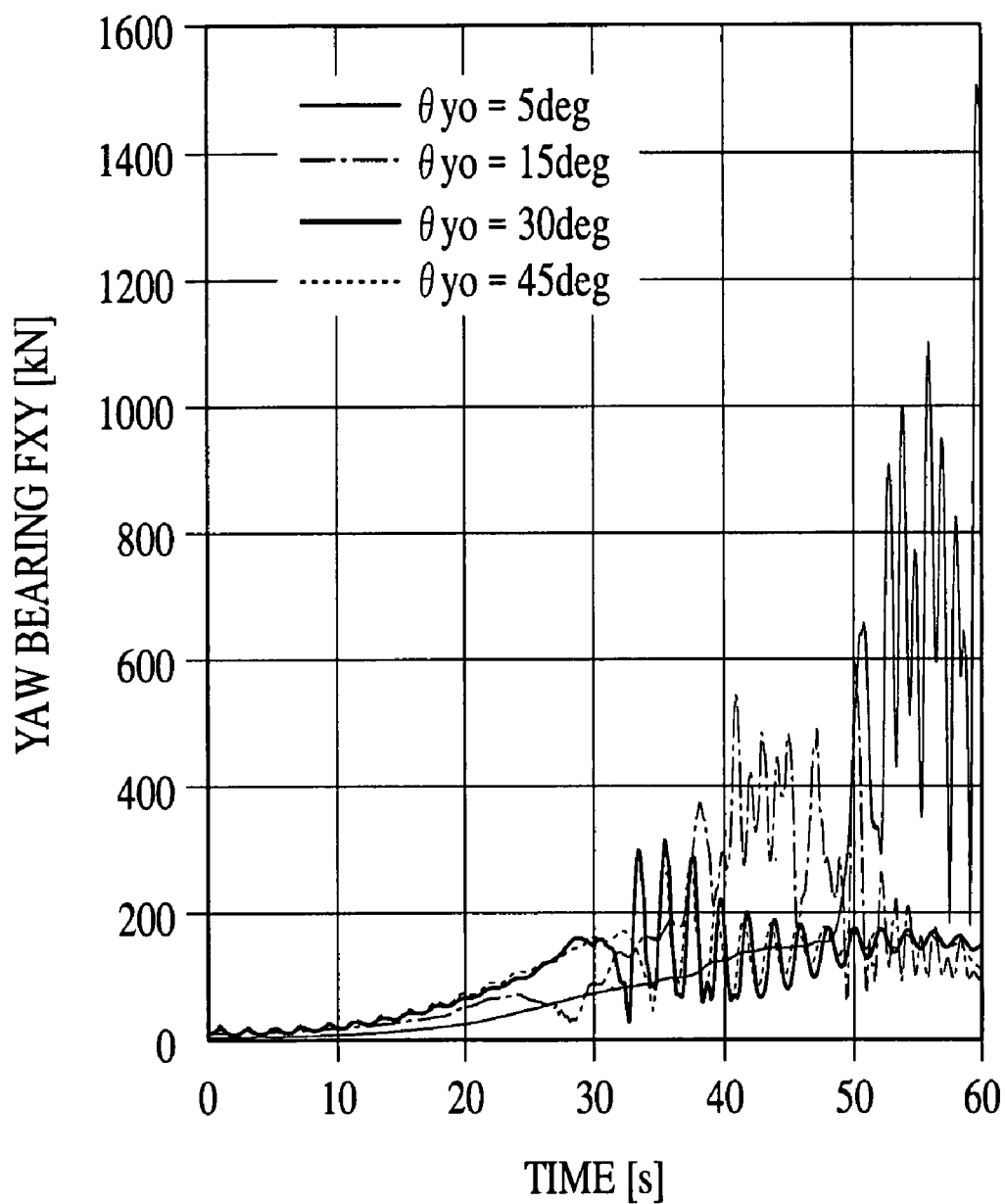
FIG. 19 is a graph showing the analysis results of yaw horizontal force.

Graphs indicating the changes of yaw angles to each of the initial yaw angles $\theta y0$, and the changes of the bending moment and the yaw horizontal force under the wind condition shown in FIG. 16 were shown in FIGS. 17, 18, and 19, respectively.

As shown in FIG. 17, because the yaw angles at 0 [sec] on the abscissa axis were the initial yaw angles $\theta y0$, each graph was situated at the points of 5, 15, 30, and 45 [deg].

The rotor swung several times by comparatively large amplitudes before the rotor was stabilized to the leeward at $\theta y0=5$ [deg] and $\theta y0=15$ [deg]. On the other hand, the swingbacks at the time when the rotor revolved to the leeward were small and the rotor was rapidly stabled to the leeward at $\theta y0=30$ [deg] and $\theta y0=45$ [deg].

At $\theta y0=5$ [deg], the initial angle was kept for about 48 seconds, and a rapid yaw rotation was started after that. Moreover, the values of the bending moment and the yaw horizontal force abruptly rose.

At $\theta y0=15$ [deg], the changes were slightly lightened in comparison with that at $\theta y0=5$ [deg], the initial yaw angle was kept for about 36 seconds, and after that a yaw rotation was started. Moreover, the values of the bending moment and the yaw horizontal force rose.

Differently from the two examples mentioned above, at $\theta y0=30$ [deg] and $\theta y0=45$ [deg], the initial yaw angle was kept only for about 25 seconds, and the yaw rotation was started at a relatively early time. Moreover, the values of the bending moment and the yaw horizontal force fell in a comparatively low level.

The yaw abrupt change times, the wind speeds at the time of yaw abrupt changes, the maximum values of bending moment, the maximum values of yaw horizontal force were collected in a table 1.

TABLE 1

| INITIAL YAW ANGLE ($\theta y0$) | 5 deg | 15 deg | 30 deg | 45 deg |
|---|---|---|---|---|
| YAW ABRUPT CHANGE TIME (SEE FIG. 17) | 48 sec | 36 sec | 24 sec | 26 sec |
| YAW ABRUPT WIND SPEED (SEE FIG. 16) | about 65 m/sec | about 45 m/sec | about 28 m/sec | about 30 m/sec |
| ROTOR BENDING (SEE FIG. 18) | 4,000 kNm | 2,000 kNm | 1,100 kNm | 1,100 kNm |
| YAW HORIZONTAL FORCE (SEE FIG. 19) | 1,500 kN | 600 kN | 300 kN | 300 kN |

From the above results, in the case where the initial yaw angle $\theta y0$ was small, the rotor kept the position on the windward side until the wind speed became high, and abruptly performed yaw changing. Consequently, it could be said that a large load was produced. In the case of the present analysis example, the load could be reduced when the initial yaw angle $\theta y0$ was set to be 30 [deg] or more.

(2) Analysis of Behavior by Pitch Changing

Figure 20:
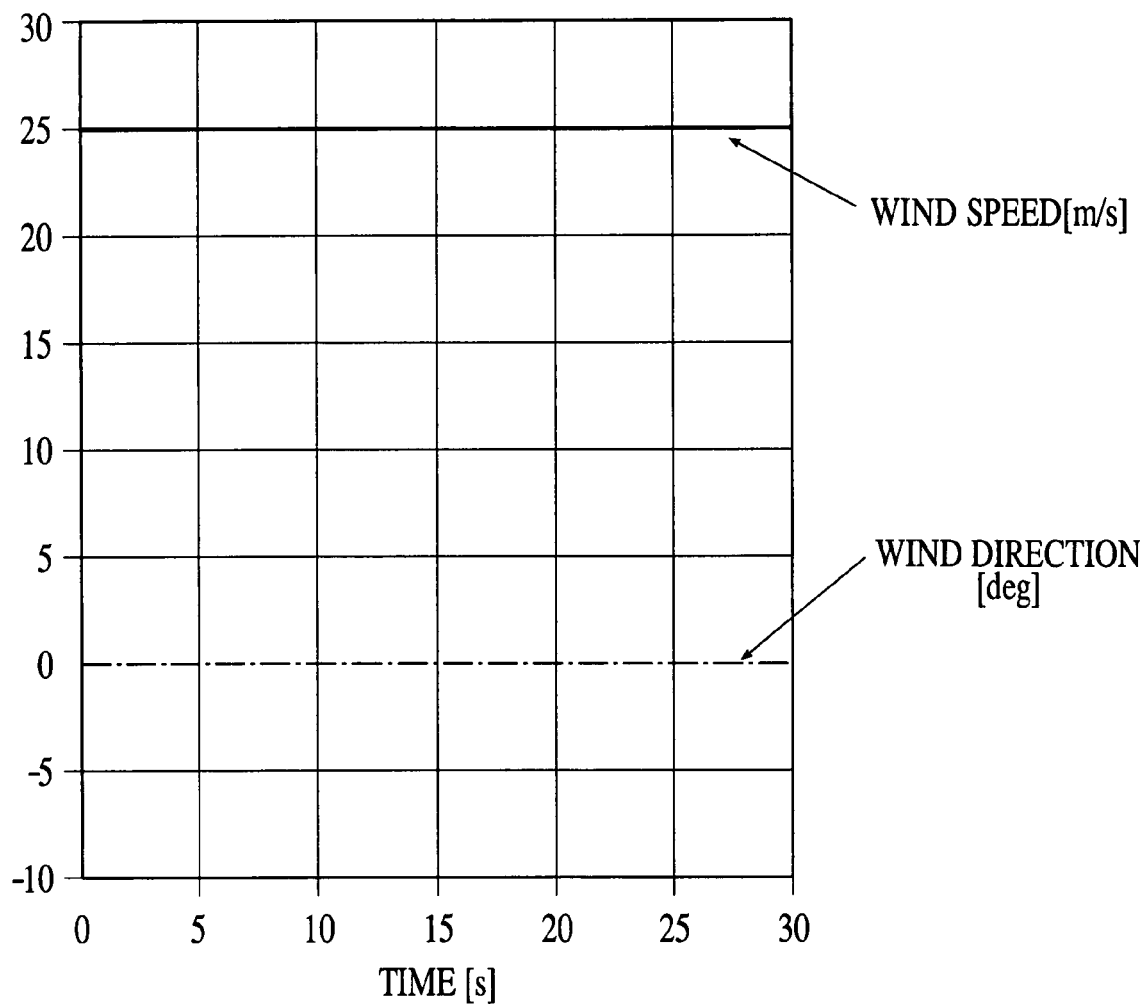
FIG. 20 is a graph showing wind conditions pertaining to analysis conditions.
Figure 21:
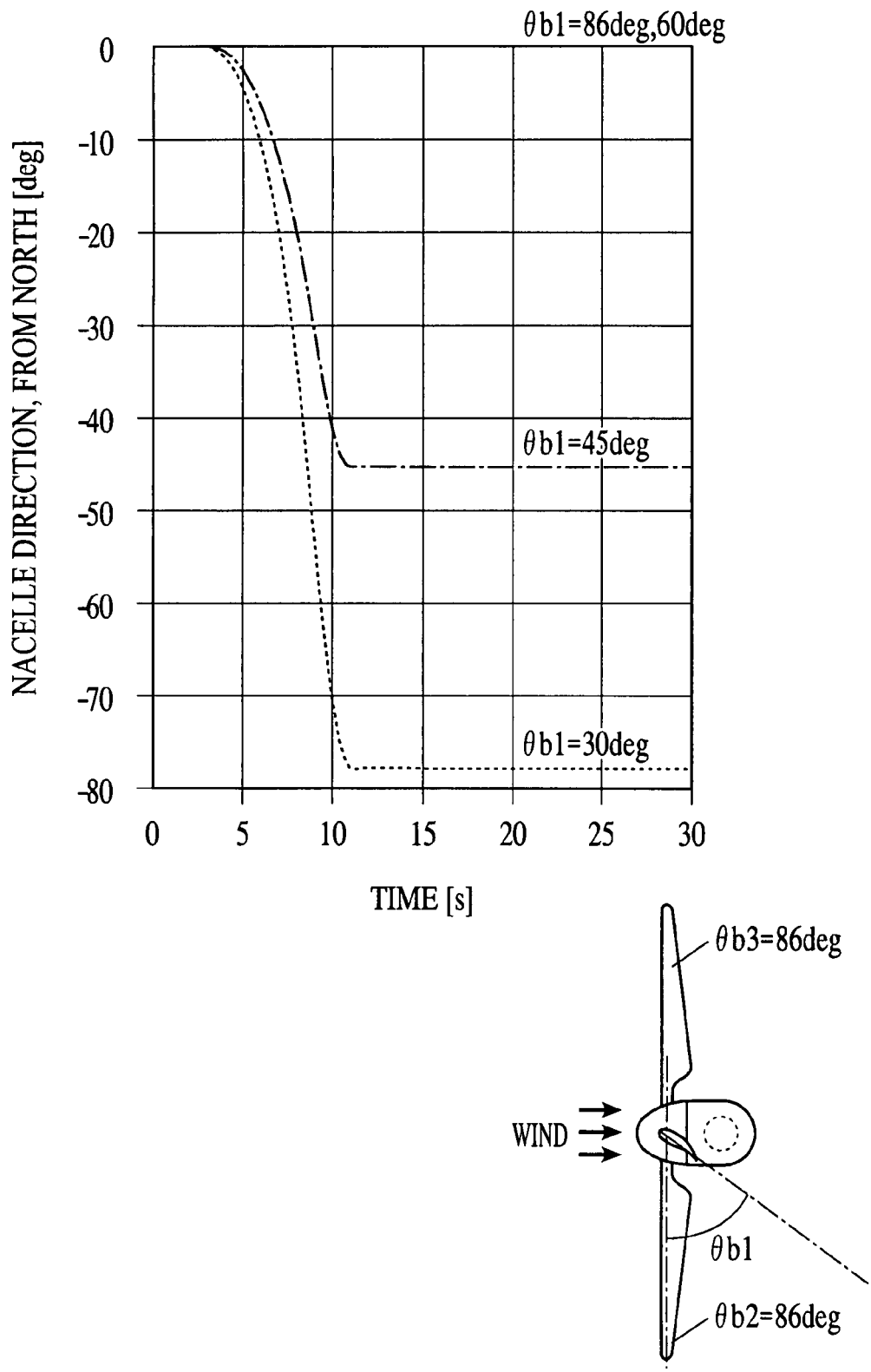
FIG. 21 is a graph showing the analysis results of nacelle azimuthal angles.

It was supposed that the pitch angles of the three blades were denoted by $\theta b1$, $\theta b2$, and $\theta b3$. The changes of the nacelle azimuthal angles (yaw angles) under the wind condition shown in FIG. 20 were analyzed by gradually changing the $\theta b1$ to be 86, 60, 45, and 30 [deg] and by setting $\theta b2=86$ [deg] and $\theta b3=86$ [deg]. A graph of the analysis results was shown in FIG. 21. The cutout wind speed was supposed to be 25 m/sec, and the wind condition was supposed to be the one in which the wind speed and the wind direction were fixed as shown in FIG. 20. The pitch angle of the feathering of the blade applied to the present analysis was 86 [deg]. As shown in FIG. 21, in all examples, the initial nacelle azimuthal angles were set as 0 [deg], that is, the analysis was started from the state in which the rotor was correctly positions to the wind direction, and the yaw brake torque was set to be 400 [kNm] from start to finish.

In the examples of $\theta b1=86$ [deg] and $\theta b1=60$ [deg], the nacelle azimuthal angles did not changed. On the other hand, in the example of θb1=45 [deg], the nacelle azimuthal angle changed to about 45 [deg] after about 11 seconds to be settled down to the angle. In the example of θb1=30 [deg], the nacelle azimuthal angle changed to about 77 [deg] after about 11 seconds to be settled down to the angle.

By the present analysis, it was found that the initial yaw angle of 30 [deg] or more could be obtained by returning only the pitch angle of one blade to about 45 [deg] after making all the blades to be in the feathering states.

(3) Conclusion

As the conclusion of the results of the analysis examples (1) and (2), it was found that the initial yaw angle θy0 of 30 [deg] or more could be obtained by returning only the pitch angle of one blade to abut 45 [deg] or less after changing all the blades to be in the feathering states to enable the load loaded on the wind turbine to be reduced by avoiding sudden nacelle rotations also after changing all blades to be in the feathering states by returning the pitch angle to the feathering one.

Because the values obtained by the analysis examples of (1) and (2) depended on the shape and the size of a horizontal axis wind turbine and the value of the yaw brake torque thereof, the conclusion was not general consideration.

However, it was found that a moderate initial yaw angle θy0 could be obtained by controlling yaw brake torque to be a moderate value after making all the blades to be in the feathering states to return only the pitch angle of one blade to the flat side moderately, and that sudden nacelle rotations could be avoided and the load loaded on the wind turbine could be reduced.

Moreover, the optimum values of θb1 and yaw brake torque could be determined by performing an analysis and an experiment of each horizontal axis wind turbine in the manner of the analyses (1) and (2) mentioned above, and the technique pertaining to the third embodiment of the present invention could widely and practically be used.

Incidentally, all the disclosures of Japanese Patent Application No. 2005-159848 filed on May 31, 2005 are incorporated herein by reference. Moreover, all the disclosers of Japanese Patent Application No. 2005-196548 filed on Jul. 5, 2005 are incorporated herein by reference. Moreover, all the disclosures of Japanese Patent Application No. 2005-249524 filed on Aug. 30, 2005 are incorporated herein by reference.

INDUSTRIAL APPLICABILITY

The present invention is useful for wind energy industries, such as wind force power generation. In particular, the present invention is suitable for securing the waiting form of a rotor swinging to the leeward even if yaw drive means does not function at the time of a windstorm.

| Description of Marks | |
|---|---|
| 1 | tower |
| 2 | nacelle |
| 3 | hub |
| 4a, 4b, 4c | blade |

The invention claimed is:

1. A horizontal axis wind turbine comprising:
a rotor including a hub and at least two blades;
a nacelle to support the rotor with a main shaft connected to the hub;
a tower to support the nacelle in a manner capable of performing a yaw rotation;
an independent pitch control device to independently control a pitch angle of each of the blades; and
a yaw control device to control the yaw rotation of the nacelle, wherein
the horizontal axis wind turbine is an up-wind type one including: an operation mode to put the rotor to a windward side of the tower by the control of the yaw control device when a wind speed is a predetermined value or less, and to utilize wind force through a rotation of the rotor; and a waiting mode to wait in preparation for the operation mode when a wind speed exceeds the predetermined value, wherein (1) the independent pitch control device includes a control operation composed of a first step of changing all the blades to be in feathering states when the wind speed exceeds the predetermined value, a second step of changing the blades to be in reverse feathering states one by one sequentially after the first step, and a third step of holding all the blades in the reverse feathering states until a return to the operation mode after the second step, and (2) the yaw control device includes a control operation to control a yaw brake to take a braking value allowing the yaw rotation by torque around a yaw axis, the torque loaded on the nacelle by the wind force, when the wind speed exceeds the predetermined value, wherein the rotor is allowed to swing a leeward of the tower by executing the control operations (1) and (2) as the waiting mode.

2. The horizontal axis wind turbine according to claim 1, wherein the yaw control device executes the control operation (2) before the independent pitch control device executes the second step.

3. The horizontal axis wind turbine according to claim 1, wherein the yaw control device executes the control operation (2) before or at the same time when the independent pitch control device executes the first step.

4. The horizontal axis wind turbine according to claim 1, wherein the predetermined yaw angle range is that of from +75 to +110 [deg] or from −75 to −110 [deg] with respect to the windward side.

5. The horizontal axis wind turbine according to claim 1, wherein the pitch control device simultaneously changes all the blades to be in the reverse feathering states at the third step.

6. A horizontal axis wind turbine comprising:
a rotor including a hub and at least two blades;
a nacelle to support the rotor with a main shaft connected to the hub;
a tower to support the nacelle in a manner capable of performing a yaw rotation;
a pitch control device to control pitch angles of the blades; and
a yaw control device to control the yaw rotation of the nacelle, wherein
the horizontal axis wind turbine is an up-wind type one including: an operation mode to put the rotor to a windward side of the tower by the control of the yaw control device when a wind speed is a predetermined value or less, and to utilize wind force through a rotation of the rotor; and a waiting mode to wait in preparation for the operation mode when a wind speed exceeds the predetermined value, wherein (1) the pitch control device includes a control operation composed of a first step of changing all the blades to be in feathering states, a third step of changing all the blades to be in reverse feathering states after the first step, and a step of holding all the blades in the reverse feathering states until a return to the operation mode after the third step, and (2) the yaw control device includes a control operation composed of a second step of controlling a yaw angle of the nacelle to be within a predetermined yaw angle range avoiding a front wind and a back wind to the rotor in synchronization with the third step, and a step of controlling a yaw brake to take a braking value allowing the yaw rotation by torque around a yaw axis, the torque loaded on the nacelle by the wind force, until a return to the operation mode after the second step, wherein the horizontal axis wind turbine executes the control operations (1) and (2) as the waiting mode.

7. A horizontal axis wind turbine comprising:

a rotor including a hub and at least two blades;

a nacelle to support the rotor with a main shaft connected to the hub;

a tower to support the nacelle in a manner capable of performing a yaw rotation;

an independent pitch control device to independently control a pitch angle of each of the blades; and a yaw control device to control the yaw rotation of the nacelle, wherein the horizontal axis wind turbine 1 is an up-wind type one including: an operation mode to put the rotor to a windward side of the tower by the control of the yaw control device when a wind speed is a predetermined value or less, and to utilize wind force through a rotation of the rotor; and a waiting mode to wait in preparation for the operation mode when a wind speed exceeds the predetermined value, wherein (1) the independent pitch control device includes a control operation composed of a first step of changing all the blades to be in feathering states when the wind speed exceeds the predetermined value, a second step of changing one blade from being in a feathering state toward a flat side after the first step and of returning the one blade to be in the feathering state after occurrence of yaw angle displacement of the nacelle, and a third step of holding all the blades to be in the feathering states until a return to the operation mode after the second step, and (2) the yaw control device includes a control operation to control a yaw brake to take a braking value allowing the yaw rotation by torque around a yaw axis, the torque loaded on the nacelle by the wind force, when the wind speed exceeds the predetermined value, wherein the yaw angle displacement of the nacelle has been obtained in the second step and the third step by executing the control operation (1), and by executing the control operation (2) before executing the second step, as the waiting mode, so that the rotor is allowed to swing a leeward of the tower.

\* \* \* \* \*